(12) United States Patent
Hirokane et al.

(10) Patent No.: US 11,060,780 B2
(45) Date of Patent: Jul. 13, 2021

(54) ICE, REFRIGERANT, ICE PRODUCTION METHOD, METHOD FOR PRODUCING COOLED ARTICLE, METHOD FOR PRODUCING REFRIGERATED ARTICLE OF PLANT/ANIMAL OR PORTION THEREOF, REFRIGERATING MATERIAL FOR PLANT/ANIMAL OR PORTION THEREOF, METHOD FOR PRODUCING FROZEN FRESH PLANT/ANIMAL OR PORTION THEREOF, DEFROSTED ARTICLE OR PROCESSED ARTICLE THEREOF, AND FREEZING MATERIAL FOR FRESH PLANT/ANIMAL OR PORTION THEREOF

(71) Applicant: BLANCTEC Co., Ltd., Tokyo (JP)

(72) Inventors: Yoshio Hirokane, Tokyo (JP); Tadao Izutsu, Tokyo (JP)

(73) Assignee: BLANCTEC CO., LTD., Tokyo (JP)

( * ) Notice: Subject to any disclaimer, the term of this patent is extended or adjusted under 35 U.S.C. 154(b) by 37 days.

(21) Appl. No.: 15/777,012

(22) PCT Filed: Nov. 18, 2016

(86) PCT No.: PCT/JP2016/084319
§ 371 (c)(1),
(2) Date: May 17, 2018

(87) PCT Pub. No.: WO2017/086461
PCT Pub. Date: May 26, 2017

(65) Prior Publication Data
US 2018/0325133 A1    Nov. 15, 2018

(30) Foreign Application Priority Data

Nov. 19, 2015  (JP) .............................. JP2015-226589
Mar. 3, 2016   (JP) .............................. JP2016-041189

(Continued)

(51) Int. Cl.
*F25C 1/02*     (2006.01)
*A23B 4/09*     (2006.01)
(Continued)

(52) U.S. Cl.
CPC .................. *F25C 1/02* (2013.01); *A23B 4/02* (2013.01); *A23B 4/027* (2013.01); *A23B 4/06* (2013.01);
(Continued)

(58) Field of Classification Search
CPC ...... F25C 1/02; F25C 5/20; F25C 5/22; F25C 1/00; F25C 1/145; F25C 2301/002; F25C 17/02
See application file for complete search history.

(56) References Cited

U.S. PATENT DOCUMENTS 2,509,579 A   5/1950   Sharma
6,666,030 B2  12/2003  Furuta et al.
(Continued)

FOREIGN PATENT DOCUMENTS

CA    1267031 A1 *  6/1985
JP    50154446 A    12/1975
(Continued)

OTHER PUBLICATIONS

CA 1267031 translation.*
(Continued)

*Primary Examiner* — Elizabeth J Martin
(74) *Attorney, Agent, or Firm* — Muncy, Geissler, Olds and Lowe, P.C.

(57) ABSTRACT

Provided are: ice which has excellent cooling capacity; a production method therefor; a method for producing a cooled article; and a refrigerant. Also provided are: ice in a non-separating state; and a production method therefor and ice which satisfies conditions (a) and (b) and is from a liquid (Continued)

that includes an aqueous solution comprising a solute. (a) The temperature of the ice after melting completely is less than 0° C. (b) The rate of change of the solute concentration in the aqueous solution generated from the ice in the melting process is 30% or lower. The refrigerant includes the ice. The refrigerant also includes water which comprises the same solute as the solute included in the ice, wherein the ratio of the concentration of the solute in the ice and the concentration of the solute in the water is preferably 75:25 to 20:80.

5 Claims, 10 Drawing Sheets

(30) Foreign Application Priority Data

| May 24, 2016 | (JP) | JP2016-103012 |
|---|---|---|
| May 24, 2016 | (JP) | JP2016-103013 |
| May 24, 2016 | (JP) | JP2016-103014 |
| May 24, 2016 | (JP) | JP2016-103637 |
| May 24, 2016 | (JP) | JP2016-103638 |
| May 24, 2016 | (JP) | JP2016-103639 |
| May 24, 2016 | (JP) | JP2016-103640 |
| Jul. 4, 2016 | (JP) | JP2016-132615 |

(51) Int. Cl.

| A23L 3/375 | (2006.01) |
|---|---|
| A23B 4/027 | (2006.01) |
| F25D 3/02 | (2006.01) |
| F25C 1/00 | (2006.01) |
| A23L 3/36 | (2006.01) |
| F25D 15/00 | (2006.01) |
| A23B 4/06 | (2006.01) |
| A23B 4/02 | (2006.01) |
| F25C 5/20 | (2018.01) |
| F25C 1/145 | (2018.01) |
| F25D 3/10 | (2006.01) |
| F25B 9/00 | (2006.01) |
| F25D 3/04 | (2006.01) |

(52) U.S. Cl.
CPC ........ *A23B 4/09* (2013.01); *A23L 3/36* (2013.01); *A23L 3/375* (2013.01); *F25B 9/002* (2013.01); *F25C 1/00* (2013.01); *F25C 1/145* (2013.01); *F25C 5/20* (2018.01); *F25C 5/22* (2018.01); *F25D 3/02* (2013.01); *F25D 3/045* (2013.01); *F25D 3/10* (2013.01); *F25D 15/00* (2013.01); *A23V 2002/00* (2013.01); *F25C 2301/002* (2013.01); *Y02A 40/963* (2018.01)

(56) References Cited

U.S. PATENT DOCUMENTS

| 6,793,007 B1 * | 9/2004 | Kramer | C09K 5/10 |
| | | | 165/80.4 |
| 2013/0306904 A1 | 11/2013 | Trujillo et al. | |
| 2015/0107292 A1 | 4/2015 | Cousaert et al. | |

FOREIGN PATENT DOCUMENTS

| JP | 54084045 A | 7/1979 |
|---|---|---|
| JP | S61205767 A | 9/1986 |
| JP | 62003736 A | 1/1987 |
| JP | 63178786 A | 11/1988 |
| JP | 04031283 A | 2/1992 |
| JP | H06123534 A | 5/1994 |
| JP | 0656665 U | 8/1994 |
| JP | H09229525 A | 9/1997 |
| JP | 10009734 A | 1/1998 |
| JP | H10205940 A | 8/1998 |
| JP | 2000354454 A | 12/2000 |
| JP | 2001066030 A | 3/2001 |
| JP | 2002115945 A | 4/2002 |
| JP | 2002162136 A | 6/2002 |
| JP | 2003056953 A | 2/2003 |
| JP | 2004026174 A | 1/2004 |
| JP | 2005003231 A | 1/2005 |
| JP | 2006078137 A | 3/2006 |
| JP | 2006158301 A | 6/2006 |
| JP | 2006214683 A | 8/2006 |
| JP | 2006258334 A | 9/2006 |
| JP | 2007040548 A | 2/2007 |
| JP | 2007175699 A | 7/2007 |
| JP | 2008202863 A | 9/2008 |
| JP | 2011075197 A | 4/2011 |
| JP | 2013036628 A | 2/2013 |
| JP | 2014031935 A | 2/2014 |
| JP | 2014508268 A | 4/2014 |
| JP | 2014119238 A | 6/2014 |
| JP | 6234529 B2 | 11/2017 |
| RU | 2131096 C1 | 5/1999 |
| RU | 2228493 C1 | 5/2004 |
| RU | 74350 U1 | 6/2008 |
| SU | 1013710 A | 12/1981 |
| SU | 1634223 A1 | 8/1988 |
| WO | 2012104787 A1 | 8/2012 |
| WO | 2014197950 A1 | 12/2014 |

OTHER PUBLICATIONS

JP Notification of Reasons for Refusal corresponding to Application No. 2016-132615; dated Jan. 31, 2017.
Kaisui Flake Seihyoki, [online], Iceman Corp., published on Nov. 4, 2015 (Nov. 4, 2015)< [retrieval date: Jan. 20, 2017 (Jan. 20, 2017)]URL:https://www.youtube.com/watch?v=lzmLq_rF18U, a whole article.
The Refrigeration, Issued date Nov. 15, 2015 (Nov. 15, 2015), vol. 90, No. 1057, p. 2, lower part, 'Iceman Corp.' Kokoku.
G.H. Robertson et al., "Methodology for Direct Contact Freezing of Vegetables in Aqueous Freezing Medium," USDA Western Regional Research Lab, Journal of Food Science, vol. 41, 1976, pp. 845-851.
U.S. Appl. No. 15/777,034, filed May 17, 2018.
J.E. Tanner, "Observations of Rapid Freezing of Salt Solutions," American Foundation of Biological Research, Cryobiology, 1975, vol. 12, p. 353-363.
U.S. Appl. No. 15/777,025, filed May 17, 2018.
U.S. Appl. No. 15/777,021, filed May 17, 2018.
Decision of Refusal issued in corresponding JP Patent Application No. 2017-551959; dated Jan. 29, 2019.
Notification of Reasons for Refusal corresponding to JP Application No. 2017-551959; dated Nov. 20, 2018.
Written Opposition issued in corresponding JP Patent No. 6388420; dated Jan. 9, 2019.
Office Action and Search Report issued in the corresponding RU Patent Application No. 2018121637; dated Jan. 10, 2019.
Office Action and Search Report issued in corresponding RU Patent Application No. 2018121638, dated Jan. 14, 2019.
Office Action and Search Report issued in corresponding RU Patent Application No. 2018121507, dated Jan. 14, 2019.
RU Office Action issued in the Patent Application No. RU2018121506, dated Feb. 1, 2019.

* cited by examiner

ICE, REFRIGERANT, ICE PRODUCTION METHOD, METHOD FOR PRODUCING COOLED ARTICLE, METHOD FOR PRODUCING REFRIGERATED ARTICLE OF PLANT/ANIMAL OR PORTION THEREOF, REFRIGERATING MATERIAL FOR PLANT/ANIMAL OR PORTION THEREOF, METHOD FOR PRODUCING FROZEN FRESH PLANT/ANIMAL OR PORTION THEREOF, DEFROSTED ARTICLE OR PROCESSED ARTICLE THEREOF, AND FREEZING MATERIAL FOR FRESH PLANT/ANIMAL OR PORTION THEREOF

CROSS REFERENCE TO RELATED APPLICATIONS

This is the U.S. national stage of application No. PCT/JP2016/084319, filed on Nov. 18, 2016. Priority under 35 U.S.C. § 119(a) and 35 U.S.C. § 365(b) is claimed from Japanese Application No. 2015-226589, filed on Nov. 19, 2015; Japanese Application No. 2016-041189 filed Mar. 3, 2016; and Japanese Application Nos. 2016-103012, 2016-103013, and 2016-103014, filed May 24, 2016; and Japanese Application Nos. 2016-103637, 2016-103638, 2016-103639, 2016-103640, filed May 24, 2016; and Japanese Application No. 2016-132615, filed Jul. 4, 2016; the disclosures all of which are also incorporated herein by reference.

TECHNICAL FIELD

The present invention relates to ice, a refrigerant, a method for producing ice, and a method for producing a cooled article.

The present invention relates to a method for producing a refrigerated article of plants/animals or portions thereof, and a refrigerating material for plants/animals or portions thereof.

The present invention relates to a method for producing frozen fresh plants/animals or portions thereof, a defrosted article or a processed article thereof, and a freezing material for fresh plants/animals or portions thereof.

BACKGROUND ART

Hitherto, ice has been used for cooling an article to be cooled for the purpose of maintaining the freshness of fish and the like.

Patent Document 1 discloses a method for cooling fish by bringing ice composed of saline solution into contact with the fish to maintain the freshness of the fish. Patent Document 1 discloses a method in which aqueous salt solution is accumulated in a container and cooled from the outside as a method for producing ice composed of saline solution.

In addition, it has been conventionally practiced to cool plants/animals such as fresh marine products or portions thereof with iced water to maintain the freshness thereof. However, in the case of ice formed from fresh water, the salt concentration in seawater used for maintaining the freshness decreases as the ice melts. As a result, there is a problem that water intrudes into the body of the plants/animals or portions thereof immersed in the mixture of ice and water by the osmotic pressure and the freshness and the like deteriorate.

In view of this, Patent Document 2 discloses a method for generating salt-including ice which is in the form of slurry and has an ice point temperature of from −5° C. to −1° C. corresponding to the salt concentration by forming raw water such as seawater filtered and sterilized into salt-including water having a salt concentration of about from 1.0% to 1.5% through adjustment of salt concentration and subjecting the salt-including water to quick cooling in a method for ice-making salt-including water obtained by forming salt-including ice obtained through freezing of salt-including water having a salt concentration of approximately from 0.5% to 2.5% into the form of slurry.

In addition, Patent Document 3 discloses a method for freezing fresh fish by immersing the fresh fish in a liquid in which bittern is added to 0.2% to 5.0% (w/v) saline solution and the water temperature is kept at from −3° C. to 10° C. for a certain period of time.

In addition, it has been conventionally practiced to produce frozen fresh plants/animals or portions thereof by cooling fresh marine products and the like with ice in order to maintain the freshness of fresh plants/animals such as fresh marine products or portions thereof. For example, a large amount of ice is loaded on the fishing boat when a fishing boat goes fishing and captured fish are placed in a container filled with a mixture of ice and water (ice+seawater) and transported. However, in the case of ice formed from fresh water, the salt concentration in seawater used for maintaining the freshness decreases as the ice melts. As a result, there is a problem that water intrudes into the body of the fish immersed in the mixture of ice and water by the osmotic pressure and the freshness and taste of the fish deteriorate.

In view of this, Patent Document 2 discloses a method for generating salt-including ice which is in the form of slurry and has an ice point temperature of from −5° C. to −1° C. corresponding to the salt concentration by forming raw water such as seawater filtered and sterilized into salt-including water having a salt concentration of about from 1.0% to 1.5% through adjustment of salt concentration and subjecting the salt-including water to quick cooling in a method for ice-making salt-including water obtained by forming salt-including ice obtained through freezing of salt-including water having a salt concentration of approximately from 0.5% to 2.5% into the form of slurry in order to use the salt-including ice for maintaining the freshness of the produced frozen plants/animals or portions thereof.

In addition, Patent Document 3 discloses a method for immersing fresh fish in a liquid in which bittern is added to 0.2% to 5.0% (w/v) saline solution and the water temperature is kept at from −3° C. to 10° C. for a certain period of time.

Patent Document 1:Japanese Unexamined Patent Application, Publication No. 2000-354454
Patent Document 2:Japanese Unexamined Patent Application, Publication No. 2002-115945
Patent Document 3:Japanese Unexamined Patent Application, Publication No. 2006-158301

DISCLOSURE OF THE INVENTION

Problems to be Solved by the Invention

However, the temperature of the ice itself is likely to increase during cooling and the capacity of the ice to cool the article to be cooled is not sufficient in the case of ice as produced by the method in which the aqueous salt solution is cooled from the outside described in Patent Document 1.

The present invention has been made in view of the above circumstances, and an object thereof is to provide ice having an excellent cooling capacity, a production method therefor, a method for producing a cooled article, and a refrigerant.

Another object of the present invention is to provide ice which is in a non-separating state and a production method therefor.

In addition, when plants/animals or portions thereof are frozen, the moisture therein crystallizes and destroys the cell tissues of the plants/animals or portions thereof and there is thus a problem that it is difficult to maintain the freshness and the like. Hence, it is desirable to maintain plants/animals or portions thereof in a state of not freezing but being at a sufficiently low temperature. However, in the case of ice formed from conventional salt-including water, high-concentration salt water sequentially elutes in the melting process and eventually the temperature of ice increases to 0° C. For this reason, it is difficult to maintain the plants/animals or portions thereof in a state of not freezing but being at a sufficiently low temperature.

The present invention has been made in view of the above circumstances, and an object thereof is to provide a method for producing a refrigerated article of plants/animals or portions thereof, by which the plants/animals or portions thereof can be maintained in a state of not freezing but being at a sufficiently low temperature, and a refrigerating material for plants/animals or portions thereof.

In addition, moisture in fresh plants/animals crystallizes when being frozen, but in the case of a conventional method, the crystal of ice in the fresh plants/animals grows large and there is thus a problem that the cell tissues of the fresh plants/animals are destroyed and the freshness and taste cannot be maintained. In addition, in the case of the conventional methods described in Patent Documents 2 and 3, the ice point temperature of the salt-including ice in the form of slurry and the water temperature of the immersion liquid are not so low, and there is thus a problem that the freshness of fresh plants/animals can only be maintained for a short period of time and long distance transport is impossible.

The present invention has been made in view of the above circumstances, and an object thereof is to provide a method for producing frozen fresh plants/animals or portions thereof by which the freshness and taste of the fresh plants/animals or portions thereof do not deteriorate even when being frozen and the fresh plants/animals or portions thereof can be transported to a remote place for a long time, a defrosted article or a processed article thereof, and a freezing material for fresh plants/animals or portions thereof.

Means for Solving the Problems

The inventors of the present invention have found out that ice from an aqueous solution itself having a decreased solidifying point can be produced by a predetermined method, and thus have completed the present invention. More specifically, the present invention provides the following.

(1) Ice which satisfies the following conditions (a) and (b) and is from a liquid that includes an aqueous solution including a solute: (a) a temperature of the ice after melting completely is lower than 0° C.; and (b) a rate of change of solute concentration in an aqueous solution to be generated from the ice in melting process is 30% or less.

(2) The ice according to (1), in which the liquid further includes oil.

(3) The ice according to (1) or (2), in which the solute includes two or more kinds of solutes having different degrees of solidifying point depression.

(4) A refrigerant including the ice according to any one of (1) to (3).

(5) The refrigerant according to (4), further including water including the same solute as a solute included in the ice, in which a ratio of a concentration of the solute in the ice to a concentration of the solute in the water is from 75:25 to 20:80.

(6) The refrigerant according to (4) or (5), further including a solid having a higher thermal conductivity than the ice.

(7) A method for producing ice which is from a liquid that includes an aqueous solution including a solute, the method including:
a step of generating ice which is from a liquid that includes an aqueous solution including a solute on a wall surface kept at a temperature equal to or lower than a solidifying point of the aqueous solution by nebulizing the liquid that includes the aqueous solution onto the wall surface, and a step of collecting the ice generated on the wall surface, in which the step of collecting the ice includes a step of adjusting time for holding the ice on the wall surface.

(8) The method according to (7), in which the wall surface is kept at a temperature lower than a solidifying point of the aqueous solution by 5° C. or greater in the step of generating ice.

(9) A method for producing a cooled article, the method including: a step of cooling an article to be cooled using the refrigerant according to any one of (4) to (6).

(10) The method according to (9), in which a solid having a higher thermal conductivity than ice included in the refrigerant is interposed between the ice and the article to be cooled in the cooling step.

In addition, the inventors of the present invention have found out that the temperature in the melting process of ice in which (a) the temperature of the ice after melting completely is lower than 0° C. and (b) the rate of change of the solute concentration in an aqueous solution to be generated from the ice in the melting process is 30% or less can be kept constant, and thus have completed the present invention. Specifically, the present invention provides the following.

(11) A method for producing a refrigerated article of plants/animals or portions thereof, the method including:
a step of refrigerating the plants/animals or portions thereof using ice which satisfies the following conditions (a) to (c) and is from a liquid that includes an aqueous solution including a solute:
(a) a temperature of the ice after melting completely is lower than 0° C.;
(b) a rate of change of solute concentration in an aqueous solution to be generated from the ice in melting process is 30% or less; and
(c) a temperature of the ice is from a freezing point of the plants/animals or portions thereof to the freezing point+ 0.5° C.

(12) The method according to (11), in which the aqueous solution is isotonic with plants/animals or portions thereof.

(13) The method according to (11) or (12), in which the refrigeration is conducted by bringing the plants/animals or portions thereof into direct contact with the ice.

(14) The method according to any one of (11) to (13), in which the plants/animals are for food.

(15) The method according to (14), in which the plants/animals are saltwater fish and a NaCl concentration in the aqueous solution is more than 0% and less than 2%.

(16) The method according to any one of (11) to (13), in which the portion of plants/animals is an organ of an animal.

(17) The method according to any one of (11) to (16), in which the ice is ice from seawater, water prepared by adding a salt to seawater, or diluted water of seawater.

(18) The method according to any one of (11) to (17), in which a solid having a higher thermal conductivity than the ice is interposed between the ice and the plants/animals or portions thereof in the refrigerating step.

(19) The method according to any one of (11) to (18), in which the solute includes two or more kinds of solutes having different degrees of solidifying point depression.

(20) A refrigerating material for plants/animals or portions thereof, the refrigerating material including ice which satisfies the following conditions (a) to (c) and is from a liquid that includes an aqueous solution including a solute:
(a) a temperature of the ice after melting completely is lower than $0°$ C.;
(b) a rate of change of solute concentration in an aqueous solution to be generated from the ice in melting process is 30% or less; and
(c) a temperature of the ice is from a freezing point of the plants/animals or portions thereof to the freezing point+ $0.5°$ C.

(21) The refrigerating material according to (20), further including a solid having a higher thermal conductivity than the ice.

(22) The refrigerating material according to (20) or (21), in which the solute includes two or more kinds of solutes having different degrees of solidifying point depression.

In addition, in order to achieve the above object, the method for producing frozen fresh plants/animals or portions thereof according to the present invention includes the following steps:
(1) A step of producing an ice slurry by mixing ice generated by freezing salt water having a salt concentration of from 13.6% to 23.1% and salt water having a salt concentration of from 13.6% to 23.1%;
(2) A step of instantaneously freezing fresh plants/animals or portions thereof by immersing the fresh plants/animals or portions thereof in the ice slurry.

The moisture in fresh plants/animals crystallizes when being frozen, but in the case of slow freezing the fresh plants/animals, the crystal of ice grows large and thus the cell tissues of the fresh plants/animals are destroyed and the freshness and taste of the fresh plants/animals deteriorate. Meanwhile, in the present invention, fresh plants/animals are instantaneously frozen, and thus the crystal of ice generated in the tissues of the fresh plants/animals is small, the damage to the tissues of the fresh plants/animals is minor, and the freshness and taste of the fresh plants/animals are maintained.

In the present invention, fresh plants/animals are instantaneously frozen and thus the salt concentration in the salt water, which is the raw material of the ice slurry, is greatly increased as compared to the conventional one. The theoretical saturated freezing point of salt water having a salt concentration of 13.6% is $-9.8°$ C. and the theoretical saturated freezing point of salt water having a salt concentration of 23.1% is $-21.2°$ C. The freezing speed of the fresh plants/animals by the produced ice slurry slows down in a case in which the salt concentration in salt water is less than 13.6%. On the other hand, the salt precipitates as a crystal and thus the saturated freezing point of salt water increases in a case in which the salt concentration in salt water exceeds 23.1%.

Incidentally, the surface of the fresh plants/animals instantaneously freezes and is icebound even when the salt concentration is high, and thus the salt does not intrude into the fresh plants/animals.

In addition, in the method for producing frozen fresh plants/animals or portions thereof according to the present invention, it is suitable that the salt concentrations in the ice and the salt water to be mixed are about the same.

In a case in which the salt concentration in ice is higher than the salt concentration in salt water, the moisture freezes immediately after the salt water having a lower salt concentration is mixed since the temperature of the ice is lower than the saturated freezing point of the salt water. On the other hand, in a case in which the salt concentration in ice is lower than the salt concentration in salt water, the ice melts and the temperature of the ice slurry decreases since the saturated freezing point of the salt water is lower than the saturated freezing point of the ice. Consequently, it is preferable to set the salt concentrations in ice and salt water to be mixed to be about the same in order not to change the state of the ice slurry.

In addition, in the method for producing frozen fresh plants/animals or portions thereof according to the present invention, it is suitable that the mass ratio between the ice and the salt water to be mixed is ice:salt water=75:25 to 20:80.

When the mass ratio of ice exceeds 75 mass %, the ratio of solid content increases and thus a gap is formed between the fresh plants/animals and the ice slurry and the ice slurry does not come to close contact with the fresh plants/animals. On the other hand, when the mass ratio of ice is less than 20 mass %, it is difficult to instantaneously freeze fresh plants/animals with the produced ice slurry.

In addition, in the method for producing frozen fresh plants/animals or portions thereof according to the present invention, it is suitable that the instantaneously frozen fresh plants/animals are taken out from the ice slurry and the fresh plants/animals are cryopreserved at a temperature equal to or lower than the temperature at the time of instantaneous freezing. By this, the freshness and taste of the fresh plants/animals do not deteriorate even when being transported to a remote place for a long time.

In the method for producing frozen fresh plants/animals or portions thereof according to the present invention, examples of the fresh plants/animals may include fresh marine products such as saltwater fish and fresh vegetables. Examples of portions of the fresh plants/animals may include organs of animals (human and the like).

In addition, in the method for producing frozen fresh plants/animals or portions thereof according to the present invention, the ice generated by freezing salt water having a salt concentration of from 13.6% to 23.1% is preferably ice which satisfies the following conditions (a) and (b) and is from a liquid that includes an aqueous solution including a solute:
(a) A temperature of the ice after melting completely is lower than $-5°$ C.;
(b) A rate of change of solute concentration in an aqueous solution to be generated from the ice in melting process is 30% or less.

It is known that solidifying point depression that the solidifying point of the aqueous solution decreases occurs in a case in which a solute such as common salt is melted in water. By the action of solidifying point depression, the solidifying point of a conventional aqueous solution in which a solute such as common salt is melted decreases by the solidifying point depression. In other words, ice formed from such an aqueous solution is ice which is solidified at a lower temperature than ice formed of fresh water. Here, the heat required when ice converts to water is called "latent heat", but this latent heat is not accompanied by a temperature change. The ice having a decreased solidifying point is sustained in a stable state at a temperature equal to or lower than the solidifying point of fresh water at the time of melting by the effect of such latent heat and thus a state in which the cold energy is saved is sustained. Consequently, the capacity of the ice formed of such an aqueous solution to instantaneously freeze the article to be cooled is inherently higher than that of ice formed of fresh water and the ice is suitable for instantaneous freezing. However, the inventors of the present invention have found out that the conventional ice which is produced by being cooled from the outside is not suitable for instantaneous freezing since the capacity of the ice to cool fresh plants/animals to be frozen is not sufficient as the temperature of the ice itself rapidly increases with time at the time of cooling for instantaneous freezing, and the reasons for this have been investigated. As a result, it has been found that in the conventional method, ice which does not include a solute is actually produced before the aqueous solution freezes even if the ice is produced from an aqueous solution including a solute such as common salt, and as a result, a mixture of ice which does not include a solute and the solute is produced or ice having a high instantaneous freezing capacity is not produced since ice having a decreased solidifying point is generated only in a slight amount.

However, the inventors of the present invention have succeeded in production of ice which has a decreased solidifying point and is from a liquid that includes an aqueous solution by a predetermined method (details will be described later). Such ice is the ice to be used in the present invention, and it is suitable for instantaneous freezing of fresh plants/animals or portions thereof. Moreover, it has been found out that the freshness and taste of the defrosted article hardly deteriorate in a case in which fresh plants/animals or portions thereof are instantaneously frozen with ice according to the present invention. The preferred ice to be used in such a production method of the present invention satisfies the conditions (a) and (b). Hereinafter, the conditions (a) and (b) will be described.

With regard to (a) above, the ice according to the present invention is an aqueous solution including a solute (common salt) in a predetermined amount, and thus the temperature of the solidifying point thereof is lower than the solidifying point of fresh water (water which does not include a solute).

For this reason, it is particularly preferable that the temperature of the ice after melting completely is lower than $-5°$ C. ($-6°$ C. or lower, $-7°$ C. or lower, $-8°$ C. or lower, $-9°$ C. or lower, $-10°$ C. or lower, $-11°$ C. or lower, $-12°$ C. or lower, $-13°$ C. or lower, $-14°$ C. or lower, $-15°$ C. or lower, $-16°$ C. or lower, $-17°$ C. or lower, $-18°$ C. or lower, $-19°$ C. or lower, $-20°$ C. or lower, and the like). Meanwhile, there is also a case in which it is preferable to bring the solidifying point closer to the freezing point of the fresh plants/animals to be frozen (for example, in order to prevent damage to fresh plants/animals), and in such a case, it is preferable that the temperature of the ice after melting completely is not too high, and for example, the temperature is preferably $-21°$ C. or higher ($-20°$ C. or higher, $-19°$ C. or higher, $-18°$ C. or higher, $-17°$ C. or higher, $-16°$ C. or higher, $-15°$ C. or higher, $-14°$ C. or higher, $-13°$ C. or higher, $-12°$ C. or higher, $-11°$ C. or higher, $-10°$ C. or higher, $-9°$ C. or higher, $-8°$ C. or higher, $-7°$ C. or higher, $-6°$ C. or higher, and the like). The "temperature of the ice after melting completely" refers to the temperature of water at the time point at which the entire ice of the present invention melts to water after melting of the ice is started by putting the ice in an environment (for example, at room temperature and atmospheric pressure) at a temperature equal to or higher than the melting point.

With regard to (b) above, it is preferable that the rate of change of the solute concentration in an aqueous solution to be generated from the ice in the melting process (hereinafter abbreviated as the "rate of change of the solute concentration" in some cases in the present specification) is 30% or less in the ice of the present invention. There is also a case in which ice having a decreased solidifying point is slightly generated even in the conventional method, but most of the ice is a mixture of ice from water which does not include a solute and the crystal of the solute and thus it does not have a sufficient instantaneous freezing capacity. In a case in which a mixture of ice from water which does not include a solute and the crystal of the solute is included in a large amount in this manner, the elution speed of the solute accompanying melting is unstable in the case of putting the ice under the melting conditions, a more amount of the solute elutes as the time point is closer to the time of start of melting, the amount of the solute to elute decreases as the melting proceeds, and the amount of the solute eluted decreases as the time point is closer to the time of completion of melting. In contrast, the ice according to the present invention is composed of ice from a liquid that includes an aqueous solution including a solute, and it is thus possible to decrease the change of the elution speed of the solute in the melting process. Specifically, it is preferable that the rate of change of the solute concentration of the aqueous solution to be generated from the ice in the melting process is 30%. Incidentally, the "rate of change of the solute concentration of the aqueous solution to be generated from the ice in the melting process" means the proportion of the concentration of the aqueous solution at the time of completion of melting to the concentration of the solute in the aqueous solution to be generated at an arbitrary time point in the melting process. Incidentally, the "solute concentration" means the concentration of the mass of the solute in the aqueous solution.

It means that the purity of the ice from the aqueous solution having a decreased solidifying point is higher, that is, the instantaneous freezing capacity is higher as the rate of change of the solute concentration in the ice of the present invention is smaller. From this viewpoint, it is preferable that the rate of change of the solute concentration is 25% or less (24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, 0.5% or less, and the like). Meanwhile, the rate of change of the solute concentration may be 0.1% or more (0.5% or more, 1% or more, 2% or more, 3% or more, 4% or more, 5% or more, 6% or more, 7% or more, 8% or more, 9% or more, 10% or more, 11% or more, 12% or more, 13% or more, 14% or more, 15% or more, 16% or more, 17% or more, 18% or more, 19% or more, 20% or more, and the like).

In the present invention, the term "ice" refers to one obtained as a liquid that includes an aqueous solution freezes.

The liquid constituting the ice according to the present invention may be, for example, a liquid which further includes oil in addition to the aqueous solution including a solute described above. Examples of such a liquid may include raw milk, industrial waste including water and oil (waste milk and the like), but it is not particularly limited and can be appropriately selected depending on the purpose. The ice according to the present invention is sustained in a stable state at a temperature equal to or lower than the solidifying point of fresh water, that is, the ice can be sustained in a non-separating state for a long time. For this reason, in a case in which the liquid constituting the ice according to the present invention is a liquid that includes oil in this manner, a state in which the oil is uniform lasts for a long time, that is, a non-separating state can be sustained for a long time. Incidentally, the ice according to the present invention may be constituted only by one obtained by freezing the aqueous solution including a solute described above.

In a case in which the liquid constituting the ice according to the present invention further includes oil, the ratio between water and oil in the liquid is not particularly limited, and for example, it may be appropriately selected in a range of 1:99 to 99:1 (10:90 to 90:10, 20:80 to 80:20, 30:80 to 80:30, 40 to 60:40 to 60, and the like).

In addition, the ice according to the present invention may be ice from an aqueous solution including two or more kinds of solutes having different degrees of solidifying point depression. In this case, the ice according to the present invention may be a mixture of ice from an aqueous solution including one solute and ice from an aqueous solution including the other solute. In such a case, it is possible to delay melting of ice from an aqueous solution including ethylene glycol, for example, by adding ice from an aqueous solution including common salt as a solute having a different degree of solidifying point depression from ethylene glycol to ice from an aqueous solution including ethylene glycol as a solute. Alternatively, the ice according to the present invention may be ice from an aqueous solution prepared by dissolving two or more kinds of solutes in the same aqueous solution. In addition, to concurrently use two or more kinds of solutes having different degrees of solidifying point depression is also useful to decrease the melting point of ice from an aqueous solution including a solute to be the target.

For example, in the case of using common salt as a solute, it is possible to decrease the melting point of ice from saline solution by concurrently using a solute (ethylene glycol, calcium chloride, or the like) which has a superior capacity to decrease the melting point to common salt, and for example, it is possible to realize a temperature in the vicinity of −30° C., which cannot be realized only by ice from saline solution. The ratio of two or more kinds of solutes having different degrees of solidifying point depression can be appropriately changed depending on the purpose.

In addition, in the method for producing frozen fresh plants/animals or portions thereof according to the present invention, it is preferable that a solid having a higher thermal conductivity than ice is interposed between the ice and the fresh plants/animals or portions thereof in the instantaneous freezing step. It is possible to achieve instantaneous freezing of a target of instantaneous freezing (fresh plants/animals or portions thereof) in a short time by utilizing a solid having a high thermal conductivity, but in this case, the solid itself also loses cold energy in a short time and the temperature thereof is likely to increase and the solid is thus unsuitable for long-time instantaneous freezing through continuous instantaneous freezing (for example, instantaneously freezing another target of instantaneous freezing after instantaneously freezing a certain target of instantaneous freezing). Meanwhile, it is suitable not to utilize a solid having a high thermal conductivity for long-time instantaneous freezing but it is unsuitable not to utilize the solid for short-time instantaneous freezing of a target of instantaneous freezing. However, the ice of the present invention has a high instantaneous freezing capacity as described above and is thus useful from the viewpoint that long-time instantaneous freezing is also possible while obtaining a short-time instantaneous freezing capacity by the solid having a high thermal conductivity. Examples of the solid having a higher thermal conductivity than the ice of the present invention may include metals (aluminum, silver, copper, gold, duralumin, antimony, cadmium, zinc, tin, bismuth, tungsten, titanium, iron, lead, nickel, platinum, magnesium, molybdenum, zirconium, beryllium, indium, niobium, chromium, cobalt, iridium, and palladium), alloys (steel (carbon steel, chromium steel, nickel steel, chromium nickel steel, silicon steel, tungsten steel, manganese steel, and the like), nickel chrome alloy, aluminum bronze, gunmetal, brass, manganin, nickel silver, constantan, solder, alumel, chromel, monel metal, platinum iridium, and the like), silicon, carbon, ceramics (alumina ceramics, forsterite ceramics, steatite ceramics, and the like), marble, and brick (magnesia brick, Corhart brick, and the like), which have a higher thermal conductivity than the ice of the present invention. Among these, it is particularly preferable to use silver, gold, and aluminum. In addition, as the solid having a higher thermal conductivity than the ice of the present invention, a solid having a thermal conductivity of 2.3 W/mK or more (3 W/mK or more, 5 W/mK or more, 8 W/mK or more, or the like) is preferable, a solid having a thermal conductivity of 10 W/mK or more (20 W/mK or more, 30 W/mK or more, 40 W/mK or more, or the like) is more preferable, a solid having a thermal conductivity of 50 W/mK or more (60 W/mK or more, 75 W/mK or more, 90 W/mK or more, or the like) is still more preferable, a solid having a thermal conductivity of 100 W/mK or more (125 W/mK or more, 150 W/mK or more, 175 W/mK or more, or the like) is yet more preferable, a solid having a thermal conductivity of 200 W/mK or more (250 W/mK or more, 300 W/mK or more, 350 W/mK or more, or the like) is still yet more preferable, a solid having a thermal conductivity of 200 W/mK or more is still yet more preferable, and a solid having a thermal conductivity of 400 W/mK or more (410 W/mK or more or the like) is particularly preferable.

The solid in the present invention may have any shape, but it preferably has a particulate shape.

In addition, the present invention is a defrosted article obtained by defrosting the frozen fresh plants/animals or portions thereof produced by the above method or a processed article thereof.

In addition, the present invention is a freezing material for fresh plants/animals or portions thereof including ice which satisfies the following conditions (a) and (b) and is from a liquid that includes an aqueous solution including a solute:
(a) A temperature of the ice after melting completely is lower than −5° C.;
(b) A rate of change of solute concentration in an aqueous solution to be generated from the ice in melting process is 30% or less.

Effects of the Invention

According to the present invention, it is possible to provide ice having an excellent cooling capacity, a production method therefor, a method for producing a cooled article, and a refrigerant. In addition, the present invention can provide ice which is in a non-separating state and a production method therefor.

In addition, according to the present invention, it is possible to maintain plants/animals or portions thereof in a state of not freezing but being at a sufficiently low temperature.

In addition, in the method for producing frozen fresh plants/animals or portions thereof according to the present invention, it is possible to instantaneously freeze fresh plants/animals by bringing the ice slurry having a greatly decreased temperature into contact with fresh plants/animals as the salt concentration in salt water, which is the raw material of ice slurry, is greatly increased as compared to the conventional one. As a result, damage to the tissues of fresh plants/animals diminishes, and the freshness and taste of fresh plants/animals are maintained. In addition, the freshness and taste of fresh plants/animals do not deteriorate even when being transported to a remote place for a long time by transporting the instantaneously frozen fresh plants/animals in a state of being cryopreserved at a temperature equal to or lower than the temperature at the time of instantaneous freezing.

PREFERRED MODE FOR CARRYING OUT THE INVENTION

Figure 1:
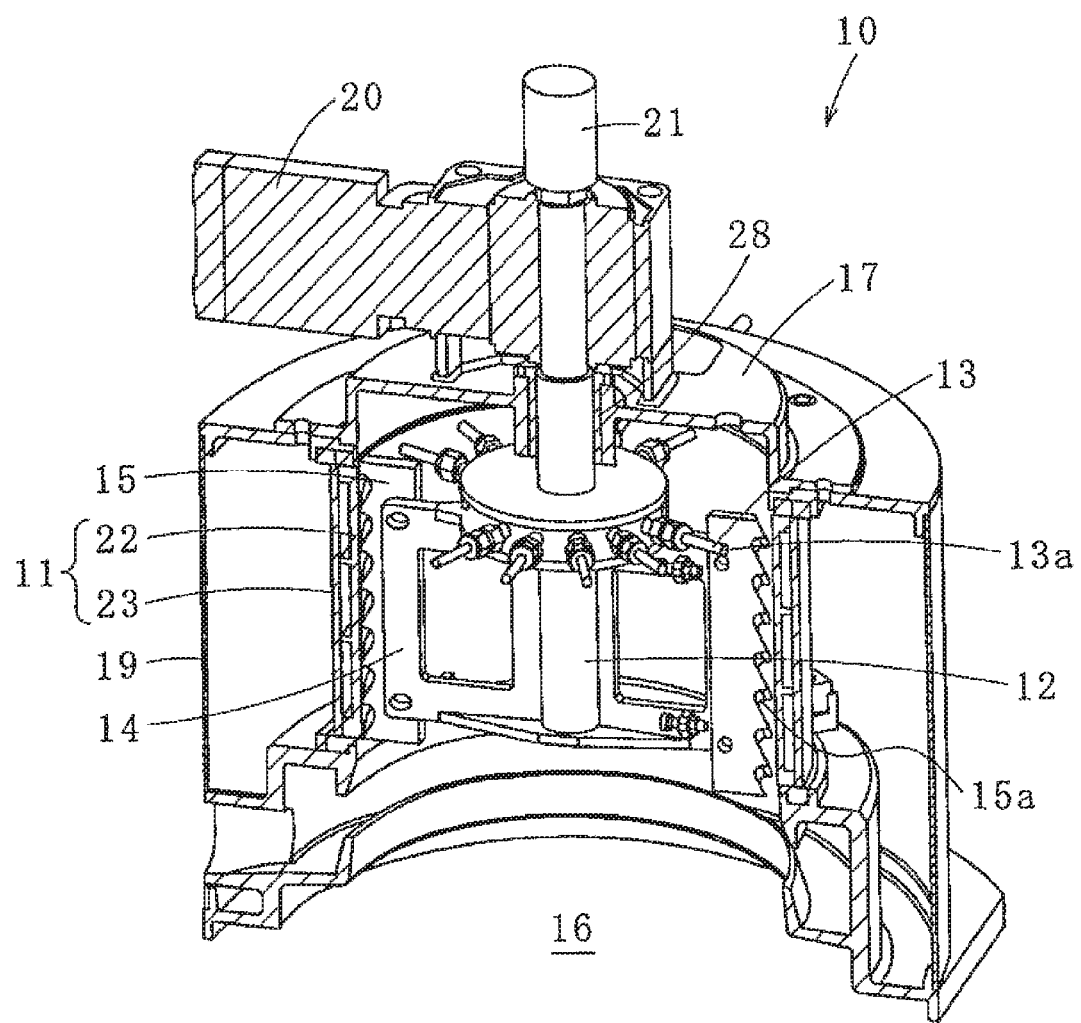
FIG. 1 is a partial cross-sectional perspective view of an ice making machine to be used in a method for producing a refrigerated article of plants/animals or portions thereof of the present invention.

Hereinafter, embodiments of the present invention will be described, but the present invention is not limited thereto.

<Ice>

The ice of the present invention is ice which satisfies the following conditions (a) and (b) and is from a liquid that includes an aqueous solution including a solute:

(a) A temperature of the ice after melting completely is lower than 0° C.;

(b) A rate of change of solute concentration in an aqueous solution to be generated from the ice in melting process is 30% or less.

It is known that solidifying point depression that the solidifying point of the aqueous solution decreases occurs in a case in which a solute is melted in water. By the action of solidifying point depression, the solidifying point of an aqueous solution in which a solute such as common salt is melted as described in Patent Document 1 above decreases. In other words, ice formed from such an aqueous solution is ice which is solidified at a lower temperature than ice formed from fresh water. Here, the heat required when ice converts to water is called "latent heat", but this latent heat is not accompanied by a temperature change. The ice having a decreased solidifying point is sustained in a stable state at a temperature equal to or lower than the solidifying point of fresh water at the time of melting by the effect of such latent heat and thus a state in which the cold energy is saved is sustained. Consequently, the capacity of the ice formed from such an aqueous solution to cool the article to be cooled is inherently higher than that of ice formed from fresh water. However, the inventors of the present invention have found out that the ice described in Patent Document 1 does not have a sufficient capacity to cool an article to be cooled as the temperature of the ice itself rapidly increases with time at the time of cooling. The inventors of the present invention have investigated the reasons for this, and as a result, have found that in the method as described in Patent Document 1, ice which does not include a solute is actually produced before the aqueous solution freezes even if the ice is produced from an aqueous solution including a solute such as common salt, and as a result, a mixture of ice which does not include a solute and the solute is produced or ice having a high cooling capacity is not produced since ice having a decreased solidifying point is generated only in a slight amount.

However, the inventors of the present invention have succeeded in production of ice which has a decreased solidifying point and is from a liquid that includes an aqueous solution by a predetermined method (details will be described later). Such ice of the present invention satisfies the conditions (a) and (b). Hereinafter, the conditions (a) and (b) will be described.

(Temperature of Ice after Melting Completely)

With regard to (a) above, the ice according to the present invention is ice from a liquid that includes an aqueous solution including a solute, and thus the temperature of the solidifying point thereof is lower than the solidifying point of fresh water (water which does not include a solute). For this reason, the ice has a feature that the temperature of the ice after melting completely is lower than 0° C. The "temperature of the ice after melting completely" refers to the temperature of water at the time point at which the entire ice of the present invention melts to water after melting of the ice is started by putting the ice in an environment (for example, at room temperature and atmospheric pressure) at a temperature equal to or higher than the melting point.

The temperature of the ice after melting completely is not particularly limited as long as it is lower than 0° C., and it can be appropriately changed by adjusting the kind and concentration of solute. It is more preferable as the temperature of the ice after melting completely is lower from the viewpoint of a higher cooling capacity, and specifically, the temperature is preferably −1° C. or lower (−2° C. or lower, −3° C. or lower, −4° C. or lower, −5° C. or lower, −6° C. or lower, −7° C. or lower, −8° C. or lower, −9° C. or lower, −10° C. or lower, −11° C. or lower, −12° C. or lower, −13° C. or lower, −14° C. or lower, −15° C. or lower, −16° C. or lower, −17° C. or lower, −18° C. or lower, −19° C. or lower, −20° C. or lower, and the like). Meanwhile, there is also a case in which it is preferable to bring the solidifying point closer to the freezing point of the article to be cooled (for example, in order to prevent damage to fresh plants/animals), and in such a case, it is preferable that the temperature of the ice after melting completely is not too high, and for example, the temperature is preferably −21° C. or higher (−20° C. or higher, −19° C. or higher, −18° C. or higher, −17° C. or higher, −16° C. or higher, −15° C. or higher, −14° C. or higher, −13° C. or higher, −12° C. or higher, −11° C. or higher, −10° C. or higher, −9° C. or higher, −8° C. or higher, −7° C. or higher, −6° C. or higher, −5° C. or higher, −4° C. or higher, −3° C. or higher, −2° C. or higher, −1° C. or higher, −0.5° C. or higher, and the like).

(Rate of Change of Solute Concentration)

With regard to (b) above, the ice of the present invention has a feature that a rate of change of the solute concentration in an aqueous solution to be generated from the ice in the melting process (hereinafter abbreviated as the "rate of change of the solute concentration" in some cases in the present specification) is 30% or less. There is also a case in which ice having a decreased solidifying point is slightly generated even in the method as described in Patent Document 1, but most of the ice is a mixture of ice from water which does not include a solute and the crystal of the solute and thus it does not have a sufficient cooling capacity. In a case in which a mixture of ice from water which does not include a solute and the crystal of the solute is included in a large amount in this manner, the elution speed of the solute accompanying melting is unstable in the case of putting the ice under the melting conditions, a more amount of the solute elutes as the time point is closer to the time of start of melting, the amount of the solute to elute decreases as the melting proceeds, and the amount of the solute eluted decreases as the time point is closer to the time of completion of melting. In contrast, the ice of the present invention is composed of ice from a liquid that includes an aqueous solution including a solute, and it thus has a feature that the change of the elution speed of the solute in the melting process is small. Specifically, the rate of change of the solute concentration of the aqueous solution to be generated from the ice in the melting process is 30%. Incidentally, the "rate of change of the solute concentration of the aqueous solution to be generated from the ice in the melting process" means the proportion of the concentration of the aqueous solution at the time of completion of melting to the concentration of the solute in the aqueous solution to be generated at an arbitrary time point in the melting process. Incidentally, the "solute concentration" means the concentration of the mass of the solute in the aqueous solution.

The rate of change of the solute concentration in the ice of the present invention is not particularly limited as long as it is 30% or less, but it means that the purity of the ice from the aqueous solution having a decreased solidifying point is higher, that is, the cooling capacity is higher as the rate of change of the solute concentration is smaller. From this viewpoint, it is preferable that the rate of change of the solute concentration is 25% or less (24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, 0.5% or less, and the like).

Meanwhile, the rate of change of the solute concentration may be 0.1% or more (0.5% or more, 1% or more, 2% or more, 3% or more, 4% or more, 5% or more, 6% or more, 7% or more, 8% or more, 9% or more, 10% or more, 11% or more, 12% or more, 13% or more, 14% or more, 15% or more, 16% or more, 17% or more, 18% or more, 19% or more, 20% or more, and the like).

(Solute)

The kind of solute to be included in the ice of the present invention is not particularly limited as long as it is a solute when water is used as a solvent, and it can be appropriately selected depending on the desired solidifying point, the application of ice to be used, and the like. Examples of the solute may include a solid solute and a liquid solute, and examples of a typical solid solute may include salts (inorganic salts, organic salts, and the like). Particularly, common salt (NaCl) among the salts is preferable since the temperature of solidifying point is not excessively decreased and it is suitable for cooling of fresh plants/animals or portions thereof. In addition, common salt is preferable from the viewpoint of easy procurement as well since it is included in seawater. In addition, examples of the liquid solute may include ethylene glycol. Incidentally, the solute may be included singly or two or more kinds thereof may be included.

The concentration of the solute included in the ice of the present invention is not particularly limited, and it can be appropriately selected depending on the kind of solute, the desired solidifying point, the application of ice to be used, and the like. For example, in the case of using common salt as a solute, it is preferable that the concentration of common salt is 0.5% (w/v) or more (1% (w/v) or more, 2% (w/v) or more, 3% (w/v) or more, 4% (w/v) or more, 5% (w/v) or more, 6% (w/v) or more, 7% (w/v) or more, 8% (w/v) or more, 9% (w/v) or more, 10% (w/v) or more, 11% (w/v) or more, 12% (w/v) or more, 13% (w/v) or more, 14% (w/v) or more, 15% (w/v) or more, 16% (w/v) or more, 17% (w/v) or more, 18% (w/v) or more, 19% (w/v) or more, 20% (w/v) or more, and the like) from the viewpoint of further decreasing the solidifying point of the aqueous solution and thus being able to obtain a high cooling capacity. Meanwhile, it is preferable not to excessively decrease the temperature of solidifying point in the case of using the ice of the present invention for cooling fresh plants/animals or portions thereof, and it is preferable that the concentration of common salt is 23% (w/v) or less (20% (w/v) or less, 19% (w/v) or less, 18% (w/v) or less, 17% (w/v) or less, 16% (w/v) or less, 15% (w/v) or less, 14% (w/v) or less, 13% (w/v) or less, 12% (w/v) or less, 11% (w/v) or less, 10% (w/v) or less, 9% (w/v) or less, 8% (w/v) or less, 7% (w/v) or less, 6% (w/v) or less, 5% (w/v) or less, 4% (w/v) or less, 3% (w/v) or less, 2% (w/v) or less, 1% (w/v) or less, and the like) from this viewpoint.

The ice of the present invention is suitable for use as a refrigerant since it has an excellent cooling capacity. Examples of a low-temperature refrigerant may include an organic solvent to be used as an anti-freezing solution such as ethanol in addition to ice, but the ice has a higher thermal conductivity and a higher specific heat than these anti-freezing solutions. For this reason, the ice having a decreased solidifying point through dissolution of a solute such as the ice of the present invention is useful from the viewpoint of having a superior cooling capacity to other refrigerants at lower than 0° C. such as an anti-freezing solution as well.

The ice of the present invention may or may not include components other than the solute described above.

In the present invention, the term "ice" refers to one obtained as a liquid that includes an aqueous solution freezes.

In addition, the ice of the present invention is sustained in a stable state at a temperature equal to or lower than the solidifying point of fresh water, that is, the ice can be sustained in a non-separating state. For this reason, for example, in a case in which the liquid constituting the ice of the present invention is a liquid which further includes oil in addition to the aqueous solution including a solute described above as will be described later, a state in which the oil is uniform lasts for a long time, that is, a non-separating state can be sustained for a long time. Incidentally, in the present invention, the "non-separating state" means a non-separating state from a macroscopic point of view (a state in which layer states are not separated), and it includes parts that are separated from a microscopic point of view (for example, a part of water and oil).

As described above, the liquid constituting the ice of the present invention may be a liquid which further includes oil in addition to the aqueous solution including a solute described above. Examples of such a liquid may include raw milk, industrial waste including water and oil (waste milk and the like). It is preferable that the liquid is raw milk from the viewpoint that the functionality when eating the ice is improved. It is presumed that the reason for that the functionality is improved in this manner is because the oil (fat) included in the raw milk is confined in the ice. Incidentally, the ice of the present invention may be constituted only by one obtained by freezing the aqueous solution including a solute described above.

In a case in which the liquid constituting the ice of the present invention further includes oil, the ratio between water and oil in the liquid is not particularly limited, and for example, it may be appropriately selected in a range of 1:99 to 99:1 (10:90 to 90:10, 20:80 to 80:20, 30:80 to 80:30, 40 to 60:40 to 60, and the like).

In addition, the ice of the present invention may be ice from an aqueous solution including two or more kinds of solutes having different degrees of solidifying point depression. In this case, the ice according to the present invention may be a mixture of ice from an aqueous solution including one solute and ice from an aqueous solution including the other solute. In such a case, it is possible to delay melting of ice from an aqueous solution including ethylene glycol, for example, by adding ice from an aqueous solution including common salt as a solute having a degree of solidifying point depression different from that of ethylene glycol to the ice from an aqueous solution including ethylene glycol as a solute. Alternatively, the ice of the present invention may be ice from an aqueous solution prepared by dissolving two or more kinds of solutes in the same aqueous solution. In addition, to concurrently use two or more kinds of solutes having different degrees of solidifying point depression is also useful to decrease the melting point of ice from an aqueous solution including a solute to be the target. For example, in the case of using common salt as a solute, it is possible to decrease the melting point of ice from saline solution by concurrently using a solute (ethylene glycol, calcium chloride, or the like) which has a superior capacity to decrease the melting point to common salt, and for example, it is possible to realize a temperature in the vicinity of −30° C., which cannot be realized only by ice from saline solution. The ratio of two or more kinds of solutes having different degrees of solidifying point depression can be appropriately changed depending on the purpose.

<Refrigerant>

The present invention includes a refrigerant including the ice described above. As described above, the ice of the present invention is suitable for a refrigerant since it has an excellent cooling capacity.

The refrigerant of the present invention may include components other than the ice described above, and for example, it may be constituted by a mixture of ice and water by including water in addition to the ice described above. For example, in the case of further including water including the same solute as the solute included in the ice, it is preferable that the concentration of the solute in the ice and the concentration of the solute in the water are close to each other. The reason is as follows.

In a case in which the solute concentration in the ice is higher than the solute concentration in the water, the temperature of the ice is lower than the saturated freezing point of the water and thus the moisture freezes immediately after the water having a lower solute concentration is mixed with the ice. On the other hand, in a case in which the solute concentration in the ice is lower than the solute concentration in the water, the saturated freezing point of the water is lower than the saturated freezing point of the ice and thus the ice melts and the temperature of the refrigerant composed of the mixture of ice and water decreases. In other words, as described above, it is preferable to set the solute concentrations in ice and water to be mixed to be about the same in order not to change the state of the mixture of ice and water (state of ice slurry). In addition, in a case in which the refrigerant is in the state of a mixture of ice and water, the water may be one generated as the ice melts or one separately prepared, but the water is preferably one generated as the ice melts.

Specifically, in the case of constituting the refrigerant of the present invention by a mixture of ice and water, the ratio of the concentration of the solute in the ice to the concentration of the solute in the water is more preferably from 75:25 to 20:80, still more preferably from 70:30 to 30:70, yet more preferably from 60:40 to 40:60, yet still more preferably from 55:45 to 45:55, particularly preferably from 52:48 to 48:52, and most preferably 50:50. Particularly in the case of using common salt as a solute, it is preferable that the ratio of the concentration of the solute in ice to the concentration of the solute in water is in the above range.

The target of cooling by the refrigerant of the present invention is not particularly limited, but the refrigerant is suitable for cooling of fresh plants/animals or portions thereof. Examples of the fresh plants/animals may include fresh fish such as saltwater fish and fresh vegetables. Examples of portions of the fresh plants/animals may include organs of animals (human and the like).

The water to be the raw material of the ice of the present invention is not particularly limited, but it is preferable that the ice is ice from seawater, water prepared by adding a salt to seawater, or diluted water of seawater in the case of using a common salt as a solute. Seawater, water prepared by adding a salt to seawater, or diluted water of seawater is easily procured, and this makes it possible to cut down the cost.

The refrigerant of the present invention may or may not further include a solid having a higher thermal conductivity than the ice of the present invention, but it is preferable to further include the solid. It is possible to achieve cooling of a target of cooling in a short time by utilizing a solid having a high thermal conductivity, but in this case, the solid itself also loses cold energy in a short time and the temperature thereof is likely to increase and the solid is thus unsuitable for long-time cooling. Meanwhile, it is suitable not to utilize a solid having a high thermal conductivity for long-time cooling but it is unsuitable not to utilize the solid for short-time cooling of a target of cooling. However, the ice of the present invention has a high cooling capacity as described above and is thus useful from the viewpoint that long-time cooling is also possible while obtaining a short-time cooling capacity by the solid having a high thermal conductivity. Examples of the solid having a higher thermal conductivity than the ice of the present invention may include metals (aluminum, silver, copper, gold, duralumin, antimony, cadmium, zinc, tin, bismuth, tungsten, titanium, iron, lead, nickel, platinum, magnesium, molybdenum, zirconium, beryllium, indium, niobium, chromium, cobalt, iridium, and palladium), alloys (steel (carbon steel, chromium steel, nickel steel, chromium nickel steel, silicon steel, tungsten steel, manganese steel, and the like), nickel chrome alloy, aluminum bronze, gunmetal, brass, manganin, nickel silver, constantan, solder, alumel, chromel, monel metal, platinum iridium, and the like), silicon, carbon, ceramics (alumina ceramics, forsterite ceramics, steatite ceramics, and the like), marble, brick (magnesia brick, Corhart brick, and the like), which have a higher thermal conductivity than the ice of the present invention. In addition, as the solid having a higher thermal conductivity than the ice of the present invention, a solid having a thermal conductivity of 2.3 W/mK or more (3 W/mK or more, 5 W/mK or more, 8 W/mK or more, or the like) is preferable, a solid having a thermal conductivity of 10 W/mK or more (20 W/mK or more, 30 W/mK or more, 40 W/mK or more, or the like) is more preferable, a solid having a thermal conductivity of 50 W/mK or more (60 W/mK or more, 75 W/mK or more, 90 W/mK or more, or the like) is still more preferable, a solid having a thermal conductivity of 100 W/mK or more (125 W/mK or more, 150 W/mK or more, 175 W/mK or more, or the like) is yet more preferable, a solid having a thermal conductivity of 200 W/mK or more (250 W/mK or more, 300 W/mK or more, 350 W/mK or more, or the like) is still yet more preferable, a solid having a thermal conductivity of 200 W/mK or more is still yet more preferable, and a solid having a thermal conductivity of 400 W/mK or more (410 W/mK or more or the like) is particularly preferable.

In a case in which the refrigerant of the present invention includes a solid having a higher thermal conductivity than the ice of the present invention described above, the refrigerant is suitable for long-time cooling even when it includes a large amount of solid as described above, and for example, the mass of the solid having a higher thermal conductivity than the ice of the present invention/the mass of the ice of the present invention included in the refrigerant (or the total mass of the ice of the present invention included in the refrigerant and the liquid that includes an aqueous solution) may be 1/100000 or more (1/50000 or more, 1/10000 or more, 1/5000or more, 1/1000 or more, 1/500 r more, 1/100 or more, 1/50 or more, 1/10 or more, 1/5 or more, 1/4 or more, 1/3 or more, 1/2 or more, and the like).

The solid in the present invention may have any shape, but it preferably has a particulate shape. In addition, the solid may be included in the form of being included inside the ice of the present invention or in the form of being included outside the ice, but the cooling capacity is higher when the solid is included in the form of being included outside the ice since the solid is likely to come into direct contact with the target of cooling. For this reason, it is preferable that the solid is included in the form of being included outside the ice. In addition, in a case in which the refrigerant of the present invention includes the solid described above, ice may be produced by the method for producing ice of the present invention to be described later and then mixed with the solid or ice may be produced in a state in which the solid is mixed with water to be a raw material of the ice in advance.

<Method for Producing Ice>

The present invention includes a method for producing ice from a liquid that includes an aqueous solution including a solute, which includes a step of generating ice which is from a liquid that includes an aqueous solution including a solute on a wall surface kept at a temperature equal to or lower than a solidifying point of the aqueous solution by nebulizing the liquid that includes the aqueous solution onto the wall surface and a step of collecting the ice generated on the wall surface. By such a method, it is possible to produce the ice of the present invention satisfying the conditions (a) and (b).

(Ice Generating Step)

The present invention is a method for producing ice which is from a liquid that includes an aqueous solution including a solute, which includes a step of generating ice which is from a liquid that includes an aqueous solution including a solute on a wall surface kept at a temperature equal to or lower than a solidifying point of the aqueous solution by nebulizing the liquid that includes the aqueous solution onto the wall surface and a step of collecting the ice generated on the wall surface.

It is impossible to produce the ice of the present invention even when a liquid that includes an aqueous solution is cooled from the outside in a state of being accumulated in a container as in Patent Document 1 described above. It is considered that this is because the cooling speed is not sufficient. However, in the production method of the present invention, rapid cooling which has not been realized in the prior art is possible as the misty aqueous solution comes into direct contact with the wall surface kept at a temperature equal to or lower than a solidifying point of the aqueous solution by nebulizing a liquid that includes an aqueous solution including a solute. It is considered that the present invention can generate ice which satisfies the conditions (a) and (b) and has a high cooling capacity by this.

Examples of the wall surface may include the inner wall of a cylindrical structure such as the vertical drum 11 in FIG. 1 to be described later, but the wall surface is not particularly limited as long as it is a wall surface which can be kept at a temperature equal to or lower than the solidifying point of the aqueous solution. The temperature of the wall surface is not particularly limited as long as it is kept at a temperature equal to or lower than the solidifying point of the aqueous solution, but it is preferable that the temperature is kept at a temperature lower by 1° C. or greater (a temperature lower by 2° C. or greater, a temperature lower by 3° C. or greater, a temperature lower by 4° C. or greater, a temperature lower by 5° C. or greater, a temperature lower by 6° C. or greater, a temperature lower by 7° C. or greater, a temperature lower by 8° C. or greater, a temperature lower by 9° C. or greater, a temperature lower by 10° C. or greater, a temperature lower by 11° C. or greater, a temperature lower by 12° C. or greater, a temperature lower by 13° C. or greater, a temperature lower by 14° C. or greater, a temperature lower by 15° C. or greater, a temperature lower by 16° C. or greater, a temperature lower by 17° C. or greater, a temperature lower by 18° C. or greater, a temperature lower by 19° C. or greater, a temperature lower by 20° C. or greater, a temperature lower by 21° C. or greater, a temperature lower by 22° C. or greater, a temperature lower by 23° C. or greater, a temperature lower by 24° C. or greater, a temperature lower by 25° C. or greater, and the like) than the solidifying point of the aqueous solution from the viewpoint of being able to produce ice which satisfies the conditions (a) and (b) and has a high purity of ice.

The nebulizing method is not particularly limited, but the liquid can be nebulized, for example, by being sprayed through a spraying means having a spraying hole as the pipe 13 in FIG. 1 to be described later. In this case, the water pressure at the time of spraying may be, for example, 0.001 MPa or more (0.002 MPa or more, 0.005 MPa or more, 0.01 MPa or more, 0.05 MPa or more, 0.1 MPa or more, 0.2 MPa or more, and the like) or 1 MPa or less (0.8 MPa or less, 0.7 MPa or less, 0.6 MPa or less, 0.5 MPa or less, 0.3 MPa or less, 0.1 MPa or less, 0.05 MPa or less, 0.01 MPa or less, and the like).

In addition, as illustrated in FIG. 1 to be described later, nebulization of the liquid may be conducted through continuous nebulization in which a rotating means such as a rotatable rotary shaft 12 is provided on the central axis of the vertical drum 11 and nebulization is conducted while rotating the rotating means.

(Collecting Step)

The present invention has a step of collecting the ice generated on the wall surface after the ice generating step described above.

Figure 2:
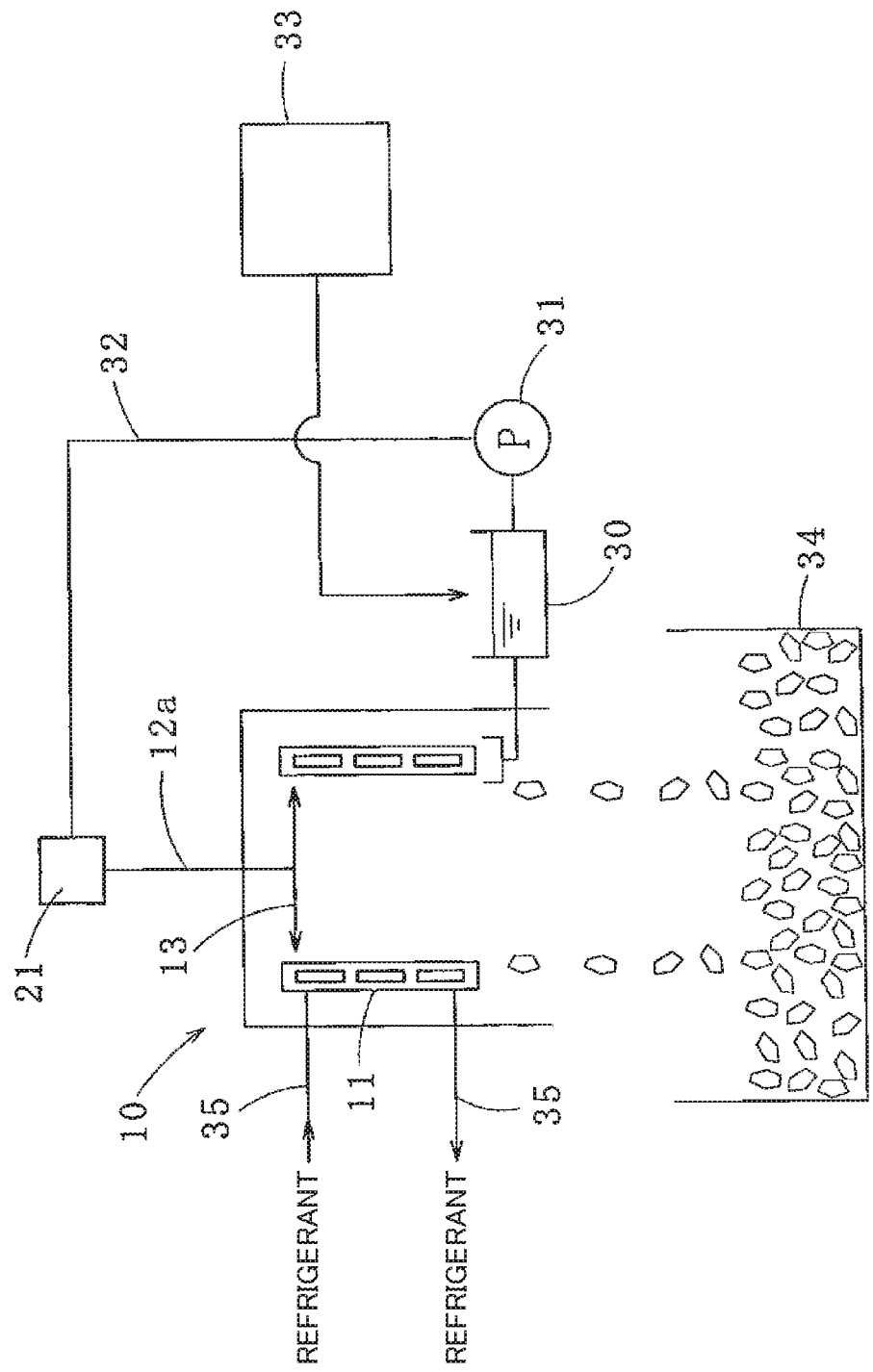
FIG. 2 is a schematic view of an ice making system using the ice making machine illustrated in FIG. 1.

The collecting method is not particularly limited, and for example, the ice on the wall surface may be scraped off using a means such as the blade 15 and the ice which has fallen may be collected as illustrated in FIG. 2 to be described later.

In addition, heat by ice making is generated when ice is generated, but there is a possibility that actual melting completion temperature is affected as the ice exposed to this heat by ice making. It is considered that the melting completion temperature is affected not only by the kind and concentration of solute but also by the heat by ice making in this manner. For this reason, the actual melting completion temperature can be adjusted by adjusting the quantity of heat by ice making remaining on the ice. The adjustment of heat by ice making can be conducted by adjusting the holding time of the ice on the wall surface in the collecting step of the present invention.

[Ice Making Machine and Ice Making System]

Hereinafter, an aspect of an ice making machine and an ice making system which can be utilized to produce the ice of the present invention will be described with reference to FIG. 1 and FIG. 2. Incidentally, common salt is used as a solute in the following example of an ice making machine.

A partial cross-sectional perspective view of an ice making machine 10 is illustrated in FIG. 1 and an ice making system including the ice making machine 10 illustrated in FIG. 2. The ice making machine 10 includes a vertical drum 11 of which the inner peripheral surface is cooled with a refrigerant, and a rotary shaft 12 which is rotated by a geared motor 20 is disposed on the central axis of the vertical drum 11. To the rotary shaft 12, a plurality of pipes 13 which rotate together with the rotary shaft 12 and have a spraying hole 13a for spraying salt water toward the inner peripheral surface of the vertical drum 11 at the tip portion and an arm 14 which extends in the radial direction of the vertical drum 11 and rotates together with the rotary shaft 12 are attached. A blade 15 for scraping off ice generated on the inner peripheral surface of the vertical drum 11 is mounted at the tip portion of the arm 14.

The vertical drum 11 has an inner cylinder 22 having an inner peripheral surface on which ice is generated and an outer cylinder 23 surrounding the inner cylinder 22. The inner cylinder 22 and the outer cylinder 23 are made of steel, and a clearance is provided between the inner cylinder 22 and the outer cylinder 23. To the clearance, a refrigerant is supplied from a freezing machine (not illustrated) via a tube 35. Incidentally, the outer peripheral surface of the vertical drum 11 is covered with a cylindrical protective cover 19.

The upper surface of the vertical drum 11 is sealed with an upper bearing member 17 having a shape formed as a pot is inverted. A bush 28 for supporting the rotary shaft 12 is fitted at the central portion of the upper bearing member 17. The rotary shaft 12 is supported only by the upper bearing member 17, and the lower end portion of the rotary shaft 12 is not pivotally supported. For this reason, there is no obstacle at the lower place of the vertical drum 11 when the ice scraped off by the blade 15 falls, and the lower surface of the vertical drum 11 serves as a discharge port 16 for discharging ice. The ice which has fallen through the discharge port 16 is stored in an ice storage tank 34 disposed immediately below the ice making machine 10 (see FIG. 2).

The rotary shaft 12 is rotated around the material axis by the geared motor 20 installed above the upper bearing member 17. A vertical hole 12a which extends in the material axial direction and communicates with each pipe 13 is formed at the upper portion of the rotary shaft 12 (see FIG. 2). In addition, a rotary joint 21 is attached to the top portion of the rotary shaft 12. Salt water to be a raw material of ice is fed from a salt water storage tank 30 to the rotary joint 21 via a tube 32 (see FIG. 2). The salt water fed to the rotary joint 21 is fed from the rotary joint 21 to the vertical hole 12a formed on the rotary shaft 12 and is fed from the vertical hole 12a to each pipe 13.

The pipe 13 radially extends from the rotary shaft 12 in the radial direction of the vertical drum 11. The installation height of each pipe 13 is set to the upper position of the height of the inner cylinder 22 of the vertical drum 11, and salt water is sprayed toward the upper portion of the inner peripheral surface of the inner cylinder 22 (see FIG. 1). The water pressure when spraying salt water through the spraying hole 13a is, for example, about 0.01 MPa. Incidentally, a spray nozzle or the like may be used instead of the pipe 13. In this case, the spraying pressure can be set to, for example, from 0.2 to 0.5 MPa.

The arm 14 is mounted so as to be symmetrical to the rotary shaft 12. In the present embodiment, the number of the arms 14 is set to two. The blade 15 mounted at the tip portion of each arm 14 is made of a stainless steel plate material having a length substantially equal to the total length (total height) of the inner cylinder 22, and a plurality of serrations 15a are formed on the end face facing the inner cylinder 22.

Next, the operation of the ice making machine 10 having the above configuration and the ice making system will be described. By running the freezing machine, the refrigerant is supplied to the vertical drum 11 to set the temperature of the inner peripheral surface of the vertical drum 11 to from −20° C. to −25° C. Subsequently, the geared motor 20 is run to supply salt water into the rotary shaft 12 via the rotary joint 21 as well as to rotate the rotary shaft 12 around the material axis. The rotational speed of the rotary shaft 12 is set to from 2 to 4 rpm. Incidentally, the rotational speed of the rotary shaft 12 is set to from 10 to 15 rpm in the case of using a spray nozzle instead of the pipe 13.

Salt water sprayed toward the inner peripheral surface of the vertical drum 11 through the pipe 13 rotating together with the rotary shaft 12 is instantly frozen when coming into contact with the inner peripheral surface of the vertical drum 11. The ice generated on the inner peripheral surface of the vertical drum 11 is scraped off by the blade 15 rotating together with the arm 14. The ice scraped off falls through the discharge port 16. The ice which has fallen through the discharge port 16 is stored in the ice storage tank 34 disposed immediately below the ice making machine 10 and used for maintaining the freshness of fresh marine products.

Meanwhile, the salt water which has not converted to ice but has flowed down the inner peripheral surface of the vertical drum 11 is stored in the salt water storage tank 30 and fed again to the rotary joint 21 via the tube 32 by running a pump 31 (see FIG. 2). Incidentally, in a case in which the salt water in the salt water storage tank 30 decreases, the salt water stored in a salt water tank 33 is supplied to the salt water storage tank 30.

<Method for Producing Cooled Article>

The present invention includes a method for producing a cooled article, which includes a step of cooling an article to be cooled using the refrigerant described above.

The article to be cooled is not particularly limited, and examples thereof may include fresh plants/animals or portions thereof. Examples of the fresh plants/animals may include fresh fish such as saltwater fish and fresh vegetables. Examples of portions of the fresh plants/animals may include organs of animals (human and the like).

The cooling method is not particularly limited, and the article to be cooled may be cooled by being directly brought into contact with the refrigerant described above or the article to be cooled may be indirectly cooled (for example, by cooling the heat conducting means which can transmit the heat source with the refrigerant and cooling the article to be cooled via the cooled heat conducting means).

In addition, in a case in which the refrigerant of the present invention described above includes a solid having a higher thermal conductivity than ice, it is preferable to conduct cooling such that the solid having a higher thermal conductivity than ice is interposed between the ice included in the refrigerant and the article to be cooled in the cooling step. By this, long-time cooling is possible while obtaining a short-time cooling capacity by the solid having a high thermal conductivity. In such a case, another substance may be interposed between every two of the ice, the solid having a higher thermal conductivity than the ice, and the article to be cooled depending on the purpose. For example, in a case in which the refrigerant includes a substance which is not preferred to be brought into direct contact with the article to be cooled (for example, it is not preferable that the refrigerant is brought into contact with the article to be cooled from the viewpoint of safety, a solid (metal or the like) having a higher thermal conductivity than the ice, and the like), cooling may be conducted such that either of the refrigerant or the article to be cooled is housed in a bag and thus the refrigerant and the article to be cooled are not brought into direct contact with each other.

EXAMPLES

Example 1

Figure 3:
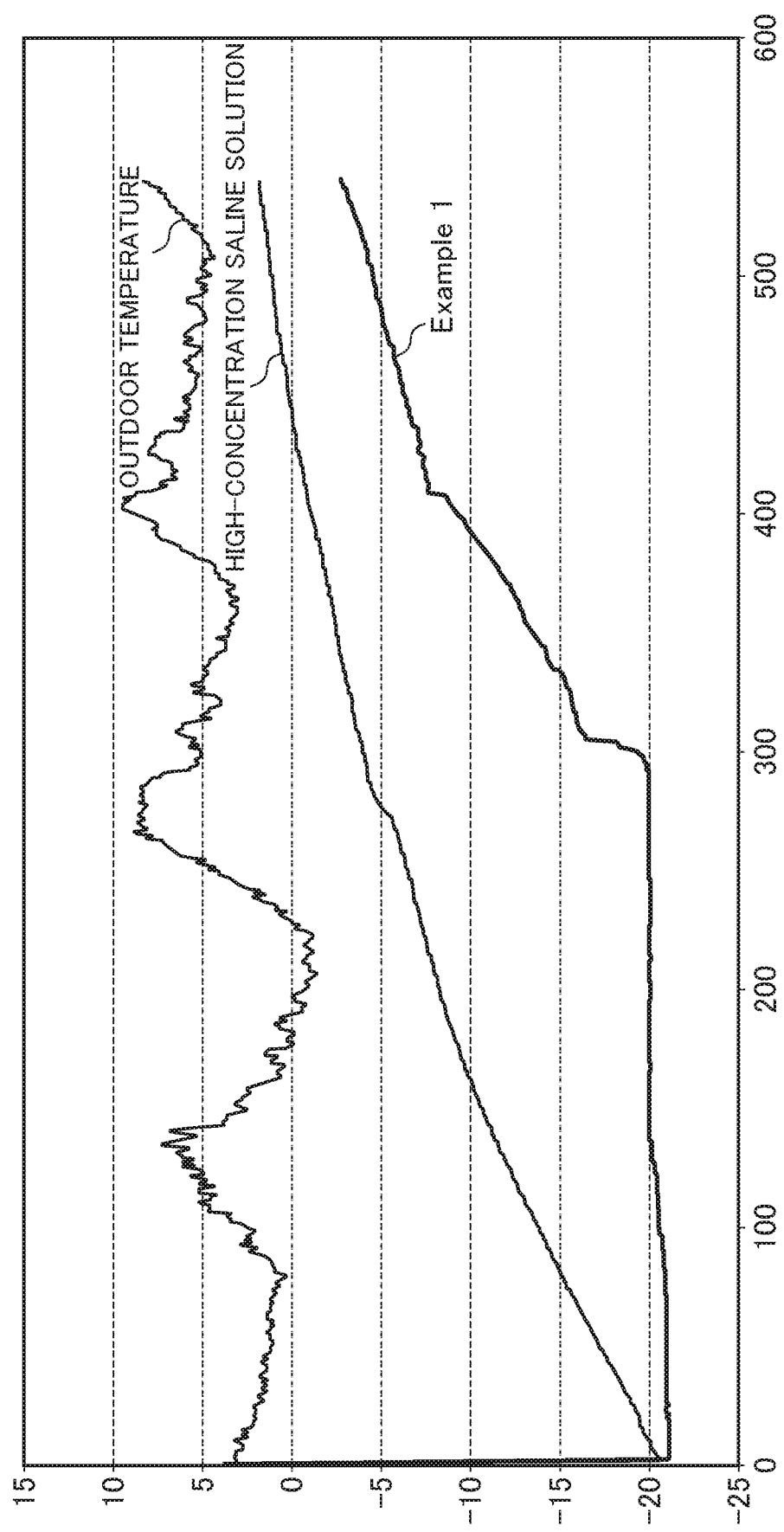
FIG. 3 is a graph illustrating the time course of the temperature of ice according to Example 1 and high-concentration saline solution.

By using the ice making machine 10 described above, ice (hereinafter referred to as the "ice according to Example 1") from an aqueous solution (saturated saline solution) including common salt as a solute at 23.1% was produced. This ice according to Example 1 had (a) a temperature lower than 0° C. after melting completely. In addition, the concentration of saline solution in the aqueous solution in the melting process was approximately constant, that is, (b) the rate of change of the solute concentration in the aqueous solution to be generated from the ice in the melting process was 30% or less. The time course of the temperature of the ice according to Example 1 was measured at the outdoor temperature. In addition, the time course of the temperature of saline solution ("high-concentration saline solution" in FIG. 3) having the same concentration as that in the ice according to Example 1 was also measured in the same manner. The results thereof are illustrated in FIG. 3. In FIG. 3, the vertical axis represents the temperature (° C.) and the horizontal axis represents the time (minute).

As illustrated in FIG. 3, the high-concentration saline solution was not frozen and thus the temperature increased in proportion to the passage of time. In contrast, it has been found that the ice according to Example 1 has a high cooling capacity by the effect of latent heat from the fact that the temperature change was hardly observed at around −20° C. until the melting was completed.

Example 2

Ice (hereinafter referred to as the "ice (solution: saturated saline solution") according to Example 2) from an aqueous solution (saturated saline solution) including common salt as a solute at 23.1% was produced in the same manner as in Example 1 by using the ice making machine 10 described above.

In addition, one in which copper was added to the ice (solution: saturated saline solution) according to Example 2 was prepared and this was used as the ice (solution: saturated saline solution+CU) according to Example 2. Furthermore, saturated saline solution (aqueous solution at −20° C.) which had not been frozen was prepared.

Fish were cooled using the ice (solution: saturated saline solution) according to Example 2, the ice (solution: saturated saline solution+CU) according to Example 2, and the saturated saline solution (aqueous solution at −20° C.) and the time course of the core temperature of fish body was measured. The results thereof are illustrated in FIG. 4.

Figure 4:
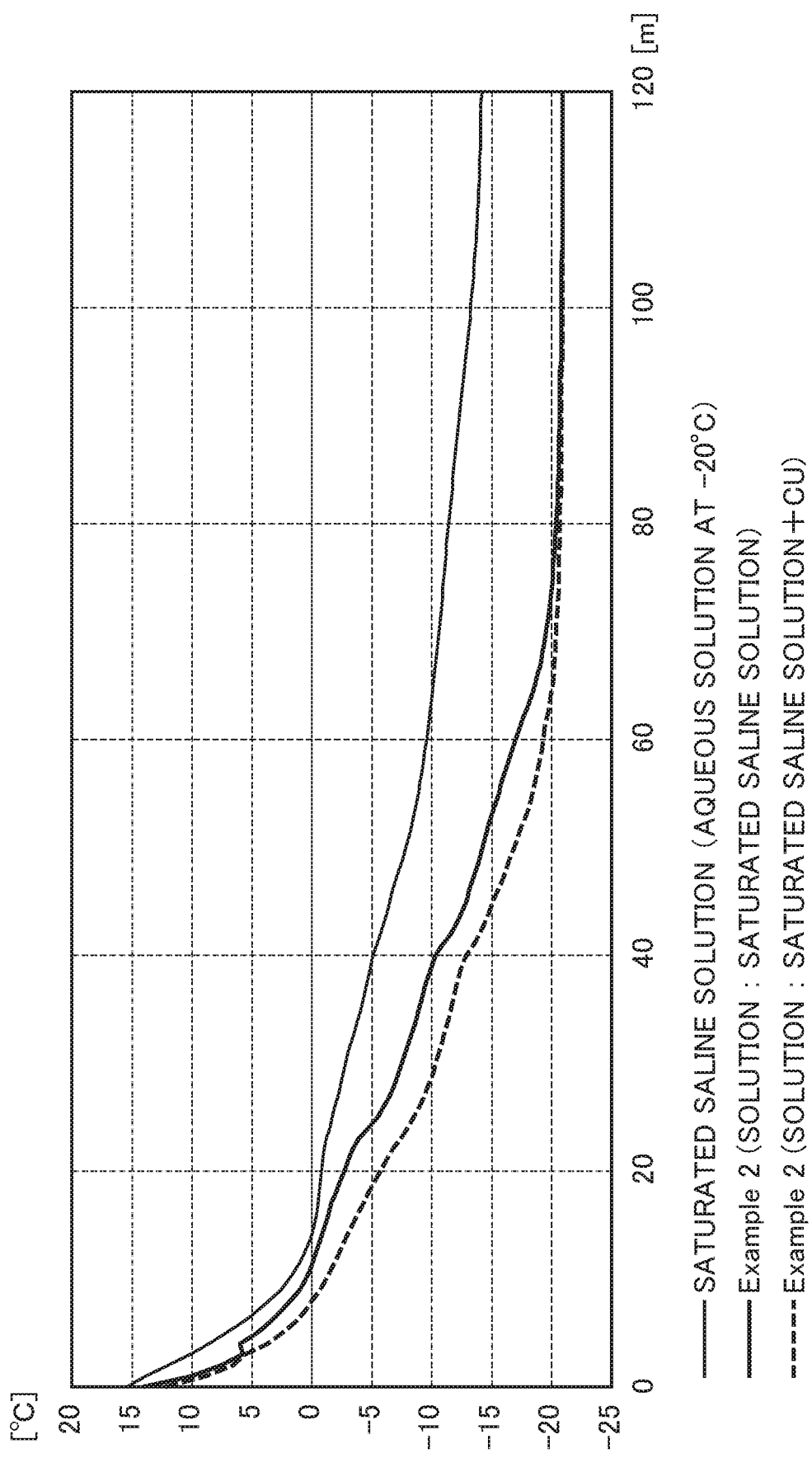
FIG. 4 is a graph illustrating the time course of the core temperature of fish body when fish are cooled with ice (solution: saturated saline solution) according to Example 2, ice (solution: saturated saline solution+CU) according to Example 2, and saturated saline solution (aqueous solution at −20° C.).

In FIG. 4, the vertical axis represents the temperature (° C.) and the horizontal axis represents the time (minute).

As illustrated in FIG. 4, it has been found that the ice (solution: saturated saline solution+CU) according to Example 2 has a higher fish cooling capacity than the ice (solution: saturated saline solution) according to Example 2. From this result, it has been found that the cooling capacity increases as a solid having a higher thermal conductivity than ice such as copper is further added to the ice.

Example 3

By using the ice making machine 10 described above, ice from raw milk according to Example 3 was produced using raw milk instead of an aqueous solution (saturated saline solution) including common salt at 23.1% by the same method as in the ice according to Example 1. The ice according to Example 3 was tasted, and as a result, it has been confirmed that the ice is hardly separated while being eaten, maintains the solid state for a long time, and is delicious. In addition, the same ice was not eaten but left to dissolve, and as a result, the raw milk generated through dissolution did not separate. Furthermore, the separation state when the ice of raw milk according to Example 3 was produced by using the ice making machine 10 described above was confirmed, and as a result, it has been confirmed that oil does not remain on the wall surface even after the ice is collected from the wall surface onto which the liquid has been nebulized and the ice is not separated even at the time of production. From these facts, it has been found that the ice of the present invention can be put in a non-separating state.

EXPLANATION OF REFERENCE NUMERALS

10: Ice making machine, 11: Vertical drum, 12: Rotary shaft, 12a: Vertical hole, 13: Pipe, 13a: Spraying hole, 14: Arm, 15: Blade, 15a: Serration, 16: Discharge port, 17: Upper bearing member, 19: Protective cover, 20: Geared motor, 21: Rotary joint, 22: Inner cylinder, 23: Outer cylinder, 28: Bush, 30: Salt water storage tank, 31: Pump, 32 and 35: Tube, 33: Salt water tank, and 34: Ice storage tank Hereinafter, embodiments of the present invention will be described, but the present invention is not particularly limited thereto.

<Method for Producing Refrigerated Article of Plant/Animal or Portion Thereof>

The present invention is a method for producing a refrigerated article of plants/animals or portions thereof, which includes a step of refrigerating the plants/animals or portions thereof using ice which satisfies the following conditions (a) to (c) and is from a liquid that includes an aqueous solution including a solute: (a) A temperature of the ice after melting completely is lower than 0° C.; (b) A rate of change of solute concentration in an aqueous solution to be generated from the ice in melting process is 30% or less; (c) A temperature is from the freezing point of the plants/animals or portions thereof to the freezing point+0.5° C.

The ice of the present invention satisfies the condition (c), and it thus has an excellent capacity to maintain the plants/animals or portions thereof in a low temperature state without freezing them. In addition, the ice satisfies the conditions (a) and (b), and thus it has a superior capacity to maintain the plants/animals or portions thereof in a low temperature state. This point is described below.

It is known that solidifying point depression that the solidifying point of the aqueous solution decreases occurs in a case in which a solute is melted in water. By the action of solidifying point depression, the solidifying point of a conventional aqueous solution in which a solute such as common salt is melted decreases. In other words, ice formed from such an aqueous solution is ice which is solidified at a lower temperature than ice formed from fresh water. Here, the heat required when ice converts to water is called "latent heat", but this latent heat is not accompanied by a temperature change. The ice having a decreased solidifying point is sustained in a stable state at a temperature equal to or lower than the solidifying point of fresh water at the time of melting by the effect of such latent heat and thus a state in which the cold energy is saved is sustained. Hence, the capacity of the ice formed from such an aqueous solution to refrigerate the article to be refrigerated is inherently higher than that of ice formed from fresh water. However, the inventors of the present invention have found out that the conventional ice as produced by being cooled from the outside actually does not have a sufficient capacity to refrigerate an article to be refrigerated as the temperature of the ice itself rapidly increases with time at the time of cooling. The inventors of the present invention have investigated the reasons for this, and as a result, have found that in the conventional method, ice which does not include a solute is actually produced before the aqueous solution freezes even if the ice is produced from an aqueous solution including a solute such as common salt, and as a result, a mixture of ice which does not include a solute and the solute is produced or ice having a high refrigerating capacity is not produced since ice having a decreased solidifying point is generated only in a slight amount.

In contrast, the inventors of the present invention have succeeded in production of ice which has a decreased solidifying point and is from a liquid that includes an aqueous solution by a predetermined method (details will be described later). Such ice of the present invention satisfies the conditions (a) to (c), and it thus has an excellent capacity to refrigerate the plants/animals or portions thereof without freezing them.

Hereinafter, ice which satisfies the conditions (a) to (c), is from a liquid that includes an aqueous solution including a solute, and is used in the production method of the present invention will be described in detail.

(Temperature of Ice after Melting Completely)

With regard to (a) above, the ice according to the present invention is ice from a liquid that includes an aqueous solution including a solute, and thus the temperature of the solidifying point thereof is lower than the solidifying point of fresh water (water which does not include a solute). For this reason, the ice has a feature that the temperature of the ice after melting completely is lower than 0° C. The "temperature of the ice after melting completely" refers to the temperature of water at the time point at which the entire ice of the present invention melts to water after melting of the ice is started by putting the ice in an environment (for example, at room temperature and atmospheric pressure) at a temperature equal to or higher than the melting point.

The temperature of the ice after melting completely is not particularly limited as long as it is lower than 0° C., and it can be appropriately changed by adjusting the kind and concentration of solute. It is more preferable as the temperature of the ice after melting completely is lower from the viewpoint of a higher refrigerating capacity, and specifically, the temperature is preferably −1° C. or lower (−2° C. or lower, −3° C. or lower, −4° C. or lower, −5° C. or lower, −6° C. or lower, −7° C. or lower, −8° C. or lower, −9° C. or lower, −10° C. or lower, −11° C. or lower, −12° C. or lower, −13° C. or lower, −14° C. or lower, −15° C. or lower, −16° C. or lower, −17° C. or lower, −18° C. or lower, −19° C. or lower, −20° C. or lower, and the like). Meanwhile, there is also a case in which it is preferable to bring the solidifying point closer to the freezing point of the article to be refrigerated (for example, in order to prevent damage to fresh plants/animals), and in such a case, it is preferable that the temperature of the ice after melting completely is not too high, and for example, the temperature is preferably −21° C. or higher (−20° C. or higher, −19° C. or higher, −18° C. or higher, −17° C. or higher, −16° C. or higher, −15° C. or higher, −14° C. or higher, −13° C. or higher, −12° C. or higher, −11° C. or higher, −10° C. or higher, −9° C. or higher, −8° C. or higher, −7° C. or higher, −6° C. or higher, −5° C. or higher, −4° C. or higher, −3° C. or higher, −2° C. or higher, −1° C. or higher, −0.5° C. or higher, and the like).

(Rate of Change of Solute Concentration)

With regard to (b) above, the ice of the present invention has a feature that a rate of change of the solute concentration in an aqueous solution to be generated from the ice in the melting process (hereinafter abbreviated as the "rate of change of the solute concentration" in some cases in the present specification) is 30% or less. There is also a case in which ice having a decreased solidifying point is slightly generated even in the method as described in Patent Document 1, but most of the ice is a mixture of ice from water which does not include a solute and the crystal of the solute and thus it does not have a sufficient refrigerating capacity. In a case in which a mixture of ice from water which does not include a solute and the crystal of the solute is included in a large amount in this manner, the elution speed of the solute accompanying melting is unstable in the case of putting the ice under the melting conditions, a more amount of the solute elutes as the time point is closer to the time of start of melting, the amount of the solute to elute decreases as the melting proceeds, and the amount of the solute eluted decreases as the time point is closer to the time of completion of melting. In contrast, the ice of the present invention is composed of ice from a liquid that includes an aqueous solution including a solute, and it thus has a feature that the change of the elution speed of the solute in the melting process is small. Specifically, the rate of change of the solute concentration of the aqueous solution to be generated from the ice in the melting process is 30%. Incidentally, the "rate of change of the solute concentration of the aqueous solution to be generated from the ice in the melting process" means the proportion of the concentration of the aqueous solution at the time of completion of melting to the concentration of the solute in the aqueous solution to be generated at an arbitrary time point in the melting process. Incidentally, the "solute concentration" means the concentration of the mass of the solute in the aqueous solution.

The rate of change of the solute concentration in the ice of the present invention is not particularly limited as long as it is 30% or less, but it means that the purity of the ice from the aqueous solution having a decreased solidifying point is higher, that is, the refrigerating capacity is higher as the rate of change of the solute concentration is smaller. From this viewpoint, it is preferable that the rate of change of the solute concentration is 25% or less (24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, 0.5% or less, and the like). Meanwhile, the rate of change of the solute concentration may be 0.1% or more (0.5% or more, 1% or more, 2% or more, 3% or more, 4% or more, 5% or more, 6% or more, 7% or more, 8% or more, 9% or more, 10% or more, 11% or more, 12% or more, 13% or more, 14% or more, 15% or more, 16% or more, 17% or more, 18% or more, 19% or more, 20% or more, and the like).

(Temperature)

With regard to (c) above, the ice of the present invention has a temperature of from the freezing point of plants/animals or portions thereof to the freezing point+0.5° C. The temperature of the ice is not limited as long as such a range is satisfied, but the effect of maintaining plants/animals or portions thereof at a low temperature is higher as the temperature of the ice is closer to the freezing point. For this reason, the ice according to the present invention is preferably at the freezing point +0.4° C. or lower, more preferably at the freezing point+0.3° C. or lower, still more preferably at the freezing point+0.2° C. or lower, yet more preferably at the freezing point+0.1° C. or lower, and particularly preferably the freezing point+0.05° C. or lower. Meanwhile, the effect of preventing freezing of plants/animals or portions thereof is superior as the temperature of the ice is higher. For this reason, the temperature of the ice is more preferably the freezing point+0.01° C. or higher, still more preferably the freezing point+0.05° C. or higher, yet more preferably the freezing point+0.1° C. or higher, yet still more preferably the freezing point+0.2° C. or higher, even yet still more preferably the freezing point+0.3° C. or higher, and particularly preferably the freezing point+0.4° C. or higher. Incidentally, the freezing point of plants/animals or portions thereof may be the freezing point of the whole of "plants/animals or portions thereof" or a freezing point of at least a part of "plants/animals or portions thereof".

(Solute)

The kind of solute to be included in the ice of the present invention is not particularly limited as long as it is a solute when water is used as a solvent, and it can be appropriately selected depending on the desired solidifying point, the application of ice to be used, and the like. Examples of the solute may include a solid solute and a liquid solute, and examples of a typical solute may include salts (inorganic salts, organic salts, and the like). Particularly, common salt (NaCl) among the salts is preferable since the temperature of solidifying point does not excessively decrease and it is suitable for cooling of fresh plants/animals or portions thereof. In addition, common salt is preferable from the viewpoint of easy procurement as well since it is included in seawater. In addition, examples of the liquid solute may include ethylene glycol. Incidentally, the solute may be included singly or two or more kinds thereof may be included.

The concentration of the solute included in the ice of the present invention is not particularly limited, and it can be appropriately selected depending on the kind of solute, the desired solidifying point determined in consideration of the target of refrigeration and the like, the application of ice to be used, and the like. For example, in the case of using common salt as a solute, it is possible to further decrease the solidifying point of the aqueous solution and thus to obtain a high refrigerating capacity, but the concentration may be appropriately changed, and for example, the concentration of common salt may be 0.5% (w/v) or more (1% (w/v) or more, 2% (w/v) or more, 3% (w/v) or more, 4% (w/v) or more, 5% (w/v) or more, 6% (w/v) or more, 7% (w/v) or more, 8% (w/v) or more, 9% (w/v) or more, 10% (w/v) or more, 11% (w/v) or more, 12% (w/v) or more, 13% (w/v) or more, 14% (w/v) or more, 15% (w/v) or more, 16% (w/v) or more, 17% (w/v) or more, 18% (w/v) or more, 19% (w/v) or more, 20% (w/v) or more, and the like) or 23% (w/v) or less (20% (w/v) or less, 19% (w/v) or less, 18% (w/v) or less, 17% (w/v) or less, 16% (w/v) or less, 15% (w/v) or less, 14% (w/v) or less, 13% (w/v) or less, 12% (w/v) or less, 11% (w/v) or less, 10% (w/v) or less, 9% (w/v) or less, 8% (w/v) or less, 7% (w/v) or less, 6% (w/v) or less, 5% (w/v) or less, 4% (w/v) or less, 3% (w/v) or less, 2% (w/v) or less, 1% (w/v) or less, and the like).

In the present invention, the term "ice" refers to one obtained as a liquid that includes an aqueous solution freezes.

The liquid constituting the ice according to the present invention may be, for example, a liquid which further includes oil in addition to the aqueous solution including a solute described above. Examples of such a liquid may include raw milk, industrial waste including water and oil (waste milk and the like), but it is not particularly limited and can be appropriately selected depending on the purpose. The ice according to the present invention is sustained in a stable state at a temperature equal to or lower than the solidifying point of fresh water, that is, the ice can be sustained in a non-separating state for a long time. For this reason, in a case in which the liquid constituting the ice according to the present invention is a liquid that includes oil in this manner, a state in which the oil is uniform lasts for a long time, that is, a non-separating state can be sustained for a long time. Incidentally, the ice according to the present invention may be constituted only by one obtained by freezing the aqueous solution including a solute described above.

In a case in which the liquid constituting the ice according to the present invention further includes oil, the ratio between water and oil in the liquid is not particularly limited, and for example, it may be appropriately selected in a range of 1:99 to 99:1 (10:90 to 90:10, 20:80 to 80:20, 30:80 to 80:30, 40 to 60:40 to 60, and the like).

In addition, the ice according to the present invention may be ice from an aqueous solution including two or more kinds of solutes having different degrees of solidifying point depression. In this case, the ice according to the present invention may be a mixture of ice from an aqueous solution including one solute and ice from an aqueous solution including the other solute. In such a case, it is possible to delay melting of ice from an aqueous solution including ethylene glycol, for example, by adding ice from an aqueous solution including common salt as a solute having a different degree of solidifying point depression from that of ethylene glycol to ice from an aqueous solution including ethylene glycol as a solute. Alternatively, the ice according to the present invention may be ice from an aqueous solution prepared by dissolving two or more kinds of solutes in the same aqueous solution. In addition, to concurrently use two or more kinds of solutes having different degrees of solidifying point depression is also useful to decrease the melting point of ice from an aqueous solution including a solute to be the target. For example, in the case of using common salt as a solute, it is possible to decrease the melting point of ice from saline solution by concurrently using a solute (ethylene glycol, calcium chloride, or the like) which has a superior capacity to decrease the melting point to common salt, and it is thus possible to realize ice having a higher refrigerating capacity. The ratio of two or more kinds of solutes having different degrees of solidifying point depression can be appropriately changed depending on the purpose.

When osmotic pressure is generated between plants/animals or portions thereof which are a target of refrigeration and an aqueous solution generated as the ice to refrigerate the plants/animals or portions thereof melts, a phenomenon occurs that the component in the interior of the plants/animals or portions thereof bleeds and flows out to the outside or the solute included in the ice flows into the plants/animals or portions thereof. It is preferable to adjust the concentration of the solute in the aqueous solution constituting the ice to be isotonic with the plants/animals or portions thereof in order to suppress this, but in the ice which is from a liquid that includes an aqueous solution and does not satisfy the conditions (a) and (b) as in the present invention, osmotic pressure is likely to be generated between plants/animals or portions thereof which are a target of refrigeration and an aqueous solution generated as the ice to refrigerate the plants/animals or portions thereof melts even when the ice is actually brought into contact with the target of refrigeration and it is difficult to realize sustained isotonicity. It is considered that the reason for this is because the ice which is from a liquid that includes an aqueous solution and does not satisfy the conditions (a) and (b) as in the present invention is not, in short, ice from a pure aqueous solution itself but a mixture of ice formed from fresh water and a solute actually accounts for most of the ice. In the case of such a mixture, the elution concentration of the solute at the time of start of melting tends to increase and the rate of change of the elution concentration is large, thus the ice does not satisfy the condition (b), and it is impossible to realize sustained isotonicity when the ice is used for refrigeration and melts even when the concentration is adjusted to be isotonic when freezing a liquid that includes an aqueous solution. In contrast, the ice from a liquid that includes an aqueous solution according to the present invention includes the ice of the aqueous solution itself, thus it satisfies the condition (b), the change of elution concentration of the solute is small in the melting process, and it is possible to realize sustained isotonicity.

Meanwhile, the isotonicity described above is one factor for realizing adjustment of the concentration of solute, but the melting point of ice is changed by adjusting the concentration of solute. In this case, it is difficult to adjust the concentration of solute so as to realize isotonicity with plants/animals or portions thereof in the case of adjusting the concentration of solute in order to satisfy the condition (c) (that is, in order to set the temperature exactly to from the freezing point of plants/animals or portions thereof to the freezing point+0.5° C.). However, the solidifying point and melting point of the ice of the present invention can be adjusted by adjusting the heat by ice making (details will be described later) remaining at the time of production of the ice, and thus the condition (c) is satisfied and the isotonicity can be more reliably realized.

It is preferable that the ice according to the present invention is ice is ice from seawater, water prepared by adding a salt to seawater, or diluted water of seawater.

Seawater, water prepared by adding a salt to seawater, or diluted water of seawater can be easily procured on the spot when capturing saltwater fish and the like in the sea and producing refrigerated articles on the spot. In addition, seawater, water prepared by adding a salt to seawater, or diluted water of seawater is useful from the viewpoint of high safety in a case in which plants/animals or portions thereof are utilized for food or as an organ for transplantation and the like. Furthermore, seawater, water prepared by adding a salt to seawater, or diluted water of seawater can also cut down the cost.

Plants/animals or portions thereof which are a target of refrigeration are not particularly limited, but the ice is suitable for refrigeration of fresh plants/animals or portions thereof. Examples of fresh plants/animals may include fresh fish such as saltwater fish and fresh vegetables. Examples of portions of the fresh plants/animals may include organs of animals (human and the like). Among these, it is particularly preferable that the plants/animals in the present invention are plants/animals for food such as fresh fish and fresh vegetables. In addition, it is preferable to set the NaCl concentration in the aqueous solution to more than 0% and less than 2% in a case in which the target of refrigeration is a saltwater fish. By this, the ice of the present invention satisfies the condition (c) and can realize isotonicity with saltwater fish in a case in which the target of refrigeration is a saltwater fish. Furthermore, it is possible to decrease the melting completion temperature to −1° C. or lower when the NaCl concentration in the aqueous solution is more than 0% and less than 2%, the ice is also useful from the viewpoint of suppressing the propagation of microorganisms in saltwater fish. In addition, as the plants/animals or portions thereof which are a target of refrigeration, an organ of an animal (for example, an organ for transplantation) is preferable. There is a case in which the freezing point of organ is different, for example, even when the organ is derived from the same person and has the same isotonic concentration, but as described above, the ice is useful from the viewpoint of satisfying the condition (c) and being able to realize isotonicity according to the present invention.

The refrigeration method is not particularly limited, and a target of refrigeration may be refrigerated by being directly brought into contact with the ice or may be indirectly refrigerated (for example, by accommodating the ice in a container or the like and bringing the container into contact with the target of refrigeration). The method in which ice is directly brought into contact with the target of refrigeration is preferable since it also has a merit from the viewpoint of preventing drying. In addition, in the case of bringing the ice into direct contact with the target of refrigeration, isotonicity cannot be realized when the ice is ice which does not satisfy the condition (b) and thus the target of refrigeration is adversely affected (bleeding, flowing of the solute component into the target of refrigeration, and the like) by direct contact, but the ice according to the present invention satisfies the condition (b) and thus it is also possible to enjoy the merit of direct contact while suppressing an adverse effect on the target of refrigeration by realizing sustained isotonicity.

The ice produced by the production method of the present invention has an excellent refrigerating capacity and is thus suitable for production of a refrigerated article. Examples of one that can be used in production of such a refrigerated article may include an organic solvent to be used as an anti-freezing solution such as ethanol in addition to the ice, but the ice has a higher thermal conductivity and a higher specific heat than these anti-freezing solutions. For this reason, the ice having a decreased solidifying point through dissolution of a solute such as the ice of the present invention is useful from the viewpoint of having a superior refrigerating capacity to other refrigerants at lower than 0° C. such as an anti-freezing solution as well.

In the production method of the present invention, components other than the ice described above may be used for refrigeration, and for example, the target of refrigeration may be refrigerated with a mixture of ice and water by using water in addition to the ice described above. For example, in the case of further using water including the same solute as the solute included in the ice for refrigeration, it is preferable that the concentration of the solute in the ice and the concentration of the solute in the water are close to each other. The reason is as follows.

In a case in which the solute concentration in the ice is higher than the solute concentration in the water, the temperature of the ice is lower than the saturated freezing point of the water and thus the moisture freezes immediately after the water having a lower solute concentration is mixed with the ice. On the other hand, in a case in which the solute concentration in the ice is lower than the solute concentration in the water, the saturated freezing point of the water is lower than the saturated freezing point of the ice and thus the ice melts and the temperature of the refrigerant composed of the mixture of ice and water decreases. In other words, as described above, it is preferable to set the solute concentrations in ice and water to be mixed to be about the same in order not to change the state of the mixture of ice and water (state of ice slurry). In addition, in the case of conducting refrigeration in the state of a mixture of ice and water, the water may be one generated as the ice melts or one separately prepared, but the water is preferably one generated as the ice melts.

Specifically, the ratio of the concentration of the solute in the ice to the concentration of the solute in the water is more preferably from 75:25 to 20:80, still more preferably from 70:30 to 30:70, yet more preferably from 60:40 to 40:60, yet still more preferably from 55:45 to 45:55, particularly preferably from 52:48 to 48:52, and most preferably 50:50.

Particularly in the case of using common salt as a solute, it is preferable that the ratio of the concentration of the solute in ice to the concentration of the solute in water is in the above range.

<Method for Producing Ice>

The ice which satisfies the conditions (a), (b), and (c) can be produced by a method including a step of generating ice which is from a liquid that includes an aqueous solution including a solute on a wall surface kept at a temperature equal to or lower than a solidifying point of the aqueous solution by nebulizing the liquid that includes the aqueous solution onto the wall surface and a step of collecting the ice generated on the wall surface. Hereinafter, the method will be described in detail. Incidentally, the condition (c) can be satisfied by producing ice having a solidifying point so as to satisfy the condition (c) by the following method and then adjusting the temperature thereof by a known temperature adjusting means (for example, putting the ice at room temperature).

(Ice Generating Step)

The ice generating step is a method for producing ice which is from a liquid that includes an aqueous solution including a solute and is a step of generating ice which is from a liquid that includes an aqueous solution including a solute on a wall surface kept at a temperature equal to or lower than a solidifying point of the aqueous solution by nebulizing the liquid that includes the aqueous solution onto the wall surface and a step of collecting the ice generated on the wall surface.

It is impossible to produce ice which satisfies the conditions (a), (b), and (c) even when the ice is produced by a conventional method in which a liquid that includes an aqueous solution in a state of being accumulated in a container is cooled from the outside. It is considered that this is because the cooling speed is not sufficient. However, in the production method, rapid cooling which has not been realized in the prior art is possible as the misty aqueous solution comes into direct contact with the wall surface kept at a temperature equal to or lower than a solidifying point of the aqueous solution by nebulizing a liquid that includes an aqueous solution including a solute. It is considered that ice which satisfies the conditions (a), (b), and (c) and has a high refrigerating capacity can be generated by this.

Examples of the wall surface may include the inner wall of a cylindrical structure such as the vertical drum 11 in FIG. 5 to be described later, but the wall surface is not particularly limited as long as it is a wall surface which can be kept at a temperature equal to or lower than the solidifying point of the aqueous solution. The temperature of the wall surface is not particularly limited as long as it is kept at a temperature equal to or lower than the solidifying point of the aqueous solution, but it is preferable that the temperature is kept at a temperature lower by 1° C. or greater (a temperature lower by 2° C. or greater, a temperature lower by 3° C. or greater, a temperature lower by 4° C. or greater, a temperature lower by 5° C. or greater, a temperature lower by 6° C. or greater, a temperature lower by 7° C. or greater, a temperature lower by 8° C. or greater, a temperature lower by 9° C. or greater, a temperature lower by 10° C. or greater, a temperature lower by 11° C. or greater, a temperature lower by 12° C. or greater, a temperature lower by 13° C. or greater, a temperature lower by 14° C. or greater, a temperature lower by 15° C. or greater, a temperature lower by 16° C. or greater, a temperature lower by 17° C. or greater, a temperature lower by 18° C. or greater, a temperature lower by 19° C. or greater, a temperature lower by 20° C. or greater, a temperature lower by 21° C. or greater, a temperature lower by 22° C. or greater, a temperature lower by 23° C. or greater, a temperature lower by 24° C. or greater, a temperature lower by 25° C. or greater, and the like) than the solidifying point of the aqueous solution from the viewpoint of being able to produce ice which satisfies the conditions (a), (b), and (c) and has a high purity of ice.

The nebulizing method is not particularly limited, but the liquid can be nebulized, for example, by being sprayed through a spraying means having a spraying hole as the pipe 13 in FIG. 5 to be described later. In this case, the water pressure at the time of spraying may be, for example, 0.001 MPa or more (0.002 MPa or more, 0.005 MPa or more, 0.01 MPa or more, 0.05 MPa or more, 0.1 MPa or more, 0.2 MPa or more, and the like) or 1 MPa or less (0.8 MPa or less, 0.7 MPa or less, 0.6 MPa or less, 0.5 MPa or less, 0.3 MPa or less, 0.1 MPa or less, 0.05 MPa or less, 0.01 MPa or less, and the like).

Figure 5:
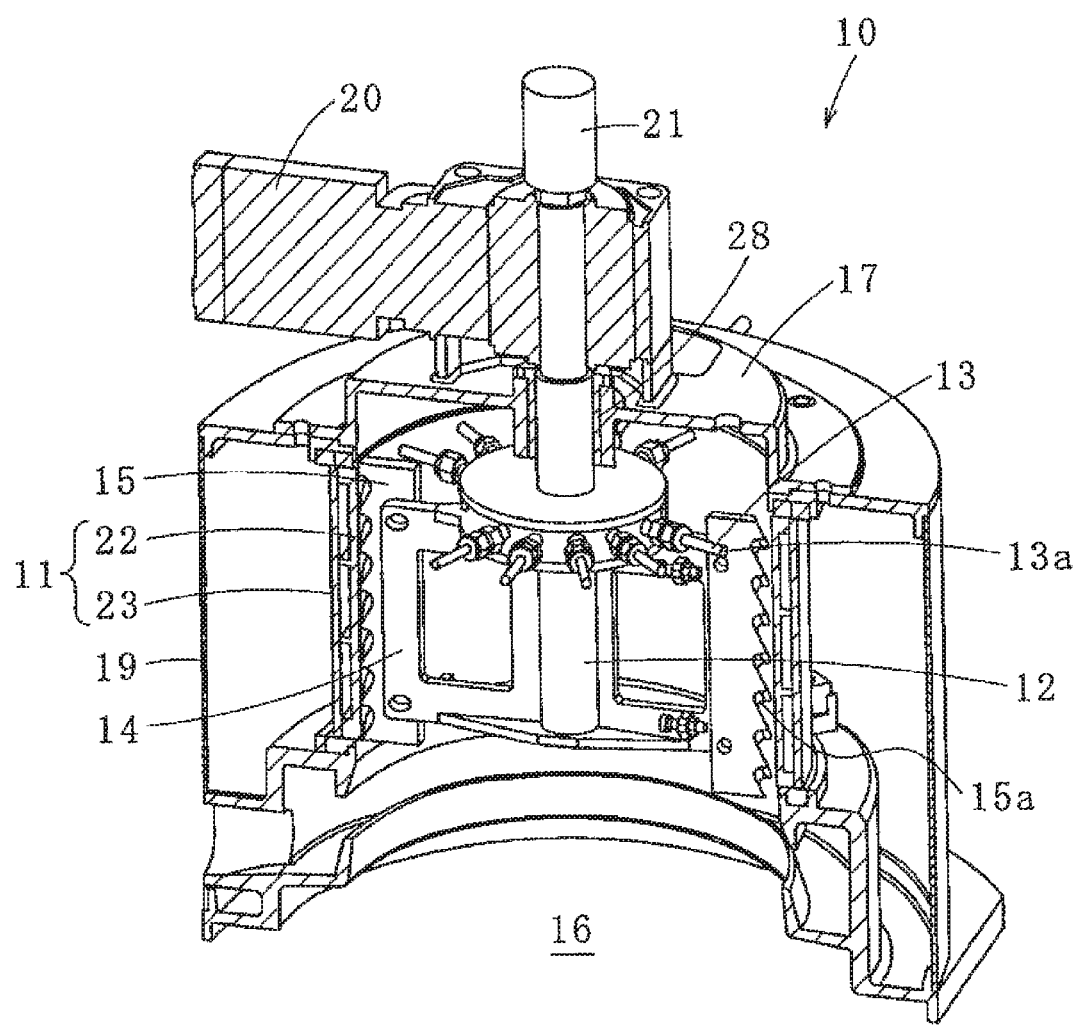
FIG. 5 is a partial cross-sectional perspective view of an ice making machine to be in a method for producing a refrigerated article of plants/animals or portions thereof of the present invention.

In addition, as illustrated in FIG. 5 to be described later, nebulization of the liquid may be conducted through continuous nebulization in which a rotating means such as a rotatable rotary shaft 12 is provided on the central axis of the vertical drum 11 and nebulization is conducted while rotating the rotating means.

(Collecting Step)

The collecting step is a step of collecting the ice generated on the wall surface after the ice generating step described above.

Figure 6:
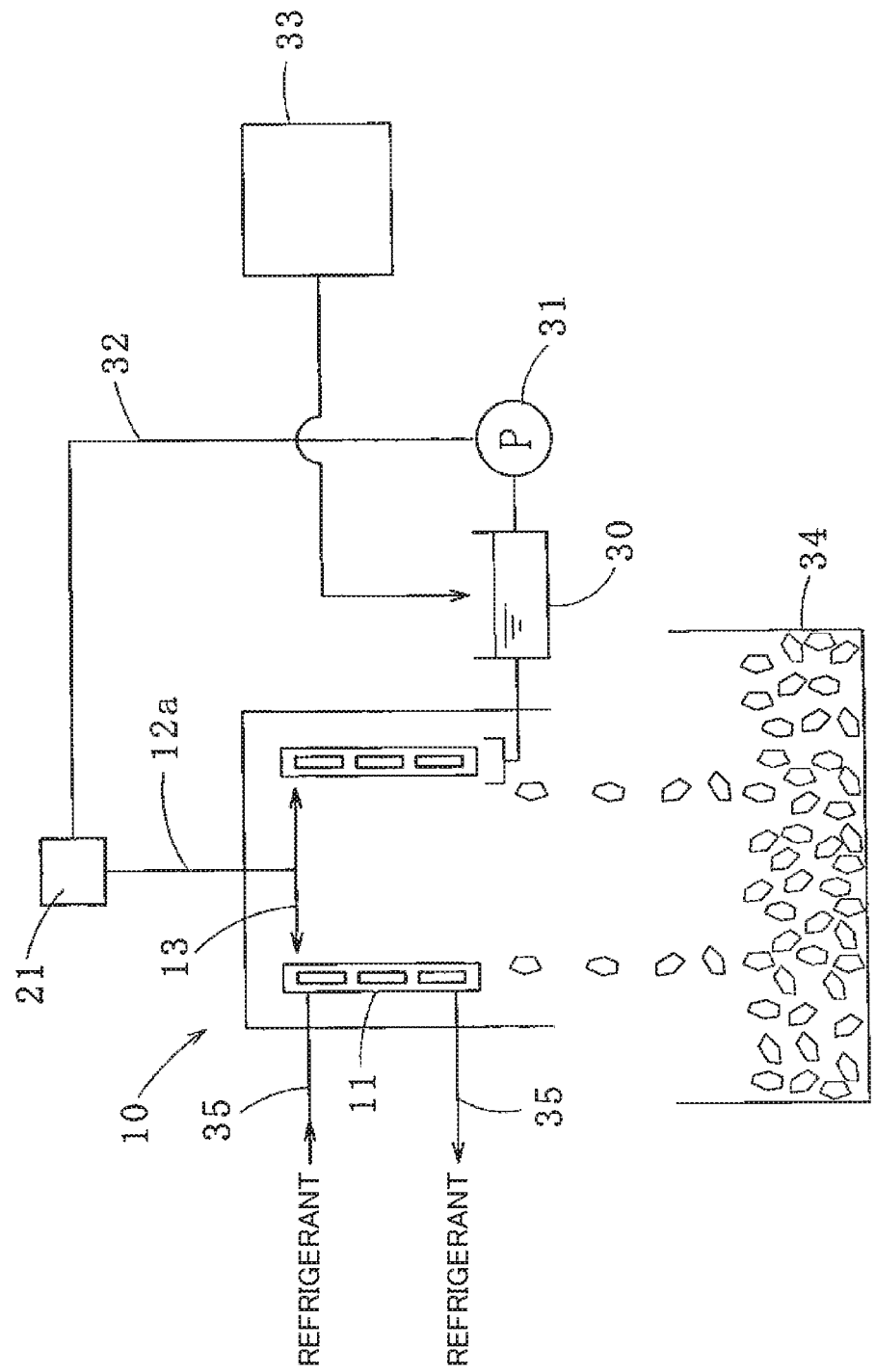
FIG. 6 is a schematic view of an ice making system using the ice making machine illustrated in FIG. 5.

The collecting method is not particularly limited, and for example, the ice on the wall surface may be scraped off using a means such as the blade 15 and the ice which has fallen may be collected as illustrated in FIG. 6 to be described later.

In addition, it is known that the melting point and solidifying point of water depend on the kind and concentration of solute, but the inventors of the present invention have found out the possibility of factors which affect the melting point and the solidifying point other than these. In other words, heat by ice making is generated when ice is generated, but the inventors of the present invention have found out that there is a possibility that actual melting completion temperature is affected as the ice exposed to this heat by ice making. It is considered that the melting completion temperature is affected not only by the kind and concentration of solute but also by the heat by ice making in this manner. For this reason, the actual melting completion temperature can be adjusted by adjusting the quantity of heat by ice making remaining on the ice. It is possible to produce ice having a desired melting completion temperature while realizing the isotonicity when the actual melting completion temperature can be adjusted. The adjustment of heat by ice making can be conducted by adjusting the holding time of the ice on the wall surface in the collecting step.

[Ice Making Machine and Ice Making System]

Hereinafter, an aspect of an ice making machine and an ice making system which can be utilized to produce ice by the production method described above will be described with reference to FIG. 5 and FIG. 6. Incidentally, common salt is used as a solute in the following example of an ice making machine.

A partial cross-sectional perspective view of an ice making machine 10 is illustrated in FIG. 5 and an ice making system including the ice making machine 10 illustrated in FIG. 6. The ice making machine 10 includes a vertical drum 11 of which the inner peripheral surface is cooled with a refrigerant, and a rotary shaft 12 which is rotated by a geared motor 20 is disposed on the central axis of the vertical drum 11. To the rotary shaft 12, a plurality of pipes 13 which rotate together with the rotary shaft 12 and have a spraying hole 13a for spraying salt water toward the inner peripheral surface of the vertical drum 11 at the tip portion and an arm 14 which extends in the radial direction of the vertical drum 11 and rotates together with the rotary shaft 12 are attached. A blade 15 for scraping off ice generated on the inner peripheral surface of the vertical drum 11 is mounted at the tip portion of the arm 14.

The vertical drum 11 has an inner cylinder 22 having an inner peripheral surface on which ice is generated and an outer cylinder 23 surrounding the inner cylinder 22. The inner cylinder 22 and the outer cylinder 23 are made of steel, and a clearance is provided between the inner cylinder 22 and the outer cylinder 23. To the clearance, a refrigerant is supplied from a freezing machine (not illustrated) via a tube 35. Incidentally, the outer peripheral surface of the vertical drum 11 is covered with a cylindrical protective cover 19.

The upper surface of the vertical drum 11 is sealed with an upper bearing member 17 having a shape formed as a pot is inverted. A bush 28 for supporting the rotary shaft 12 is fitted at the central portion of the upper bearing member 17. The rotary shaft 12 is supported only by the upper bearing member 17, and the lower end portion of the rotary shaft 12 is not pivotally supported. For this reason, there is no obstacle at the lower place of the vertical drum 11 when the ice scraped off by the blade 15 falls, and the lower surface of the vertical drum 11 serves as a discharge port 16 for discharging the ice. The ice which has fallen through the discharge port 16 is stored in an ice storage tank 34 disposed immediately below the ice making machine 10 (see FIG. 6).

The rotary shaft 12 is rotated around the material axis by the geared motor 20 installed above the upper bearing member 17. A vertical hole 12a which extends in the material axial direction and communicates with each pipe 13 is formed at the upper portion of the rotary shaft 12 (see FIG. 6). In addition, a rotary joint 21 is attached to the top portion of the rotary shaft 12. Salt water to be a raw material of ice is fed from a salt water storage tank 30 to the rotary joint 21 via a tube 32 (see FIG. 6). The salt water fed to the rotary joint 21 is fed from the rotary joint 21 to the vertical hole 12a formed on the rotary shaft 12 and is fed from the vertical hole 12a to each pipe 13.

The pipe 13 radially extends from the rotary shaft 12 in the radial direction of the vertical drum 11. The installation height of each pipe 13 is set to the upper position of the height of the inner cylinder 22 of the vertical drum 11, and salt water is sprayed toward the upper portion of the inner peripheral surface of the inner cylinder 22 (see FIG. 6). The water pressure when spraying salt water through the spraying hole 13a is, for example, about 0.01 MPa. Incidentally, a spray nozzle or the like may be used instead of the pipe 13. In this case, the spraying pressure can be set to, for example, from 0.2 to 0.5 MPa.

The arm 14 is mounted so as to be symmetrical to the rotary shaft 12. In the present embodiment, the number of the arms 14 is set to two. The blade 15 mounted at the tip portion of each arm 14 is made of a stainless steel plate material having a length substantially equal to the total length (total height) of the inner cylinder 22, and a plurality of serrations 15a are formed on the end face facing the inner cylinder 22.

Next, the operation of the ice making machine 10 having the above configuration and the ice making system will be described. By running the freezing machine, the refrigerant is supplied to the vertical drum 11 to set the temperature of the inner peripheral surface of the vertical drum 11 to from −20° C. to −25° C. Subsequently, the geared motor 20 is run to supply salt water into the rotary shaft 12 via the rotary joint 21 as well as to rotate the rotary shaft 12 around the material axis. The rotational speed of the rotary shaft 12 is set to from 2 to 4 rpm. Incidentally, the rotational speed of the rotary shaft 12 is set to from 10 to 15 rpm in the case of using a spray nozzle instead of the pipe 13.

Salt water sprayed toward the inner peripheral surface of the vertical drum 11 through the pipe 13 rotating together with the rotary shaft 12 is instantly frozen when coming into contact with the inner peripheral surface of the vertical drum 11. The ice generated on the inner peripheral surface of the vertical drum 11 is scraped off by the blade 15 rotating together with the arm 14. The ice scraped off falls through the discharge port 16. The ice which has fallen through the discharge port 16 is stored in the ice storage tank 34 disposed immediately below the ice making machine 10 and used for maintaining the freshness of fresh marine products.

Meanwhile, the salt water which has not converted to ice but has flowed down the inner peripheral surface of the vertical drum 11 is stored in the salt water storage tank 30 and fed again to the rotary joint 21 via the tube 32 by running a pump 31 (see FIG. 6). Incidentally, in a case in which the salt water in the salt water storage tank 30 decreases, the salt water stored in a salt water tank 33 is supplied to the salt water storage tank 30.

<Refrigerating Material>

The present invention includes a refrigerating material for plants/animals or portions thereof including ice which satisfies the following conditions (a) to (c) and is from a liquid that includes aqueous solution including a solute: (a) A temperature of the ice after melting completely is lower than 0° C.; (b) A rate of change of solute concentration in an aqueous solution to be generated from the ice in melting process is 30% or less; (c) A temperature of the ice is from a freezing point of the plants/animals or portions thereof to the freezing point+0.5° C.

As the conditions (a) to (c) for the ice of the refrigerating material of the present invention, the same conditions as the conditions (a) to (c) in the "method for producing a refrigerated article of plants/animals or portions thereof" of the present invention described above can be exemplified. In addition, as the target of refrigeration by the refrigerating material, the same target of refrigeration as those in the "method for producing a refrigerated article of plants/animals or portions thereof" of the present invention can be exemplified.

The refrigerating material of the present invention may include a component other than the ice described above, and for example, the refrigerating material may be constituted by a mixture of ice and water by including water in addition to the ice described above. For example, in a case in which water including the same solute as the solute included in the ice is further included in the refrigerating material, it is preferable that the concentration of the solute in the ice and the concentration of the solute in the water are close to each other. In addition, in in the case of conducting refrigeration in the state of a mixture of ice and water, the water may be one generated as the ice melts or one separately prepared, but the water is preferably one generated as the ice melts.

Specifically, in the case of constituting the refrigerating material of the present invention by a mixture of ice and water, the ratio of the concentration of the solute in the ice to the concentration of the solute in the water is more preferably from 75:25 to 20:80, still more preferably from 70:30 to 30:70, yet more preferably from 60:40 to 40:60, yet still more preferably from 55:45 to 45:55, particularly preferably from 52:48 to 48:52, and most preferably 50:50. Particularly in the case of using common salt as a solute, it is preferable that the ratio of the concentration of the solute in ice to the concentration of the solute in water is in the above range.

The refrigerating material of the present invention may or may not further include a solid having a higher thermal conductivity than the ice of the present invention described above, but it is preferable to further include the solid. It is possible to achieve refrigeration of a target of refrigeration (plants/animals or portions thereof) in a short time by utilizing a solid having a high thermal conductivity, but in this case, the solid itself also loses cold energy in a short time and the temperature thereof is likely to increase and the solid is thus unsuitable for long-time refrigeration. Meanwhile, it is suitable not to utilize a solid having a high thermal conductivity for long-time refrigeration but it is unsuitable not to utilize the solid for short-time refrigeration of a target of refrigeration. However, the ice of the present invention has a high refrigerating capacity as described above and is thus useful from the viewpoint that long-time refrigeration is also possible while obtaining a short-time refrigerating capacity by the solid having a high thermal conductivity. Examples of the solid having a higher thermal conductivity than the ice of the present invention may include metals (aluminum, silver, copper, gold, duralumin, antimony, cadmium, zinc, tin, bismuth, tungsten, titanium, iron, lead, nickel, platinum, magnesium, molybdenum, zirconium, beryllium, indium, niobium, chromium, cobalt, iridium, and palladium), alloys (steel (carbon steel, chromium steel, nickel steel, chromium nickel steel, silicon steel, tungsten steel, manganese steel, and the like), nickel chrome alloy, aluminum bronze, gunmetal, brass, manganin, nickel silver, constantan, solder, alumel, chromel, monel metal, platinum iridium, and the like), silicon, carbon, ceramics (alumina ceramics, forsterite ceramics, steatite ceramics, and the like), marble, brick (magnesia brick, Corhart brick, and the like), which have a higher thermal conductivity than the ice of the present invention. Among these, it is particularly preferable to use silver, gold, and aluminum. In addition, as the solid having a higher thermal conductivity than the ice of the present invention, a solid having a thermal conductivity of 2.3 W/mK or more (3 W/mK or more, 5 W/mK or more, 8 W/mK or more, or the like) is preferable, a solid having a thermal conductivity of 10 W/mK or more (20 W/mK or more, 30 W/mK or more, 40 W/mK or more, or the like) is more preferable, a solid having a thermal conductivity of 50 W/mK or more (60 W/mK or more, 75 W/mK or more, 90 W/mK or more, or the like) is still more preferable, a solid having a thermal conductivity of 100 W/mK or more (125 W/mK or more, 150 W/mK or more, 175 W/mK or more, or the like) is yet more preferable, a solid having a thermal conductivity of 200 W/mK or more (250 W/mK or more, 300 W/mK or more, 350 W/mK or more, or the like) is still yet more preferable, a solid having a thermal conductivity of 200 W/mK or more is still yet more preferable, and a solid having a thermal conductivity of 400 W/mK or more (410 W/mK or more or the like) is particularly preferable.

In a case in which the refrigerating material of the present invention includes a solid having a higher thermal conductivity than the ice of the present invention described above, the refrigerating material is suitable for long-time refrigeration even when it includes a large amount of solid as described above, and for example, the mass of the solid having a higher thermal conductivity than the ice of the present invention/the mass of the ice of the present invention included in the refrigerating material (or the total mass of the ice of the present invention included in the refrigerating material and the liquid that includes an aqueous solution) may be 1/100000 or more (1/50000 or more, 1/10000 or more, 1/5000 or more, 1/1000 or more, 1/500 or more, 1/100 or more, 1/50 or more, 1/10 or more, 1/5 or more, 1/4 or more, 1/3 or more, 1/2 or more, and the like).

The solid in the present invention may have any shape, but it preferably has a particulate shape. In addition, the solid may be included in the form of being included inside the ice of the present invention or in the form of being included outside the ice, but the refrigerating capacity is higher when the solid is included in the form of being included outside the ice since the solid is likely to come into direct contact with the target of refrigeration. For this reason, it is preferable that the solid is included in the form of being included outside the ice. In addition, in a case in which the refrigerating material of the present invention includes the solid described above, ice may be produced by the method for producing ice of the present invention and then mixed with the solid or ice may be produced in a state in which the solid is mixed with water to be a raw material of the ice in advance.

In addition, in the method for producing a refrigerated article of the present invention described above, a solid having a higher thermal conductivity than the ice of the present invention may or may not be used, but it is preferable to use the solid. In the case of using the solid, it is preferable to conduct refrigeration such that a solid having a higher thermal conductivity than ice is interposed between the ice and the plants/animals or portions thereof in the refrigerating step in the method for producing a refrigerated article of the present invention described above. By this, long-time refrigeration is possible while obtaining a short-time refrigerating capacity by a solid having a high thermal conductivity. In such a case, another substance may be interposed between every two of the ice, the solid having a higher thermal conductivity than the ice, and plants/animals or portions thereof depending on the purpose. For example, in a case in which it is not preferable that the solid is brought into contact with plants/animals or portions thereof from the viewpoint of safety, refrigeration may be conducted such that ice and either of the mixture of solid and ice or plants/animals or portions thereof is housed in a bag and thus the solid and the plants/animals or portions thereof are not brought into direct contact with each other.

EXAMPLES

By using the ice making machine 10 described above, ice (hereinafter referred to as the "ice according to Example 4") from an aqueous solution including common salt (concentration: 1%) as a solute was produced. The ice according to this Example had (a) a temperature lower than 0° C. after melting completely and (b) the rate of change of the solute concentration in the aqueous solution to be generated from the ice in the melting process was 30% or less. A part of this ice according to Example 4 was melted and a mixture of ice and water according to Example 4 was obtained. A refrigerated article was produced by refrigerating a saltwater fish using this mixture of ice and water according to Example 4. At that time, the temperature of the ice according to Example 4 was adjusted to −1° C. Such a temperature is a temperature in the range of (c) the freezing point of saltwater fish to the freezing point+0.5.

As Comparative Example, crushed ice obtained by freezing fresh water and pulverizing the ice was prepared, and a part of the crushed ice was melted and a mixture of crushed ice and water was obtained. A refrigerated article of saltwater fish was produced using the mixture of crushed ice and water.

As a result, briefing occurred in the saltwater fish of the refrigerated article produced using crushed ice (blood and the like flowed out and the freshness also deteriorated) but briefing did not occur in the saltwater fish of the refrigerated article produced using the ice according to Example 4 and the freshness was also favorable. From this fact, it has been found that refrigeration can be conducted at a low temperature while continuously realizing isotonicity.

Figure 7:
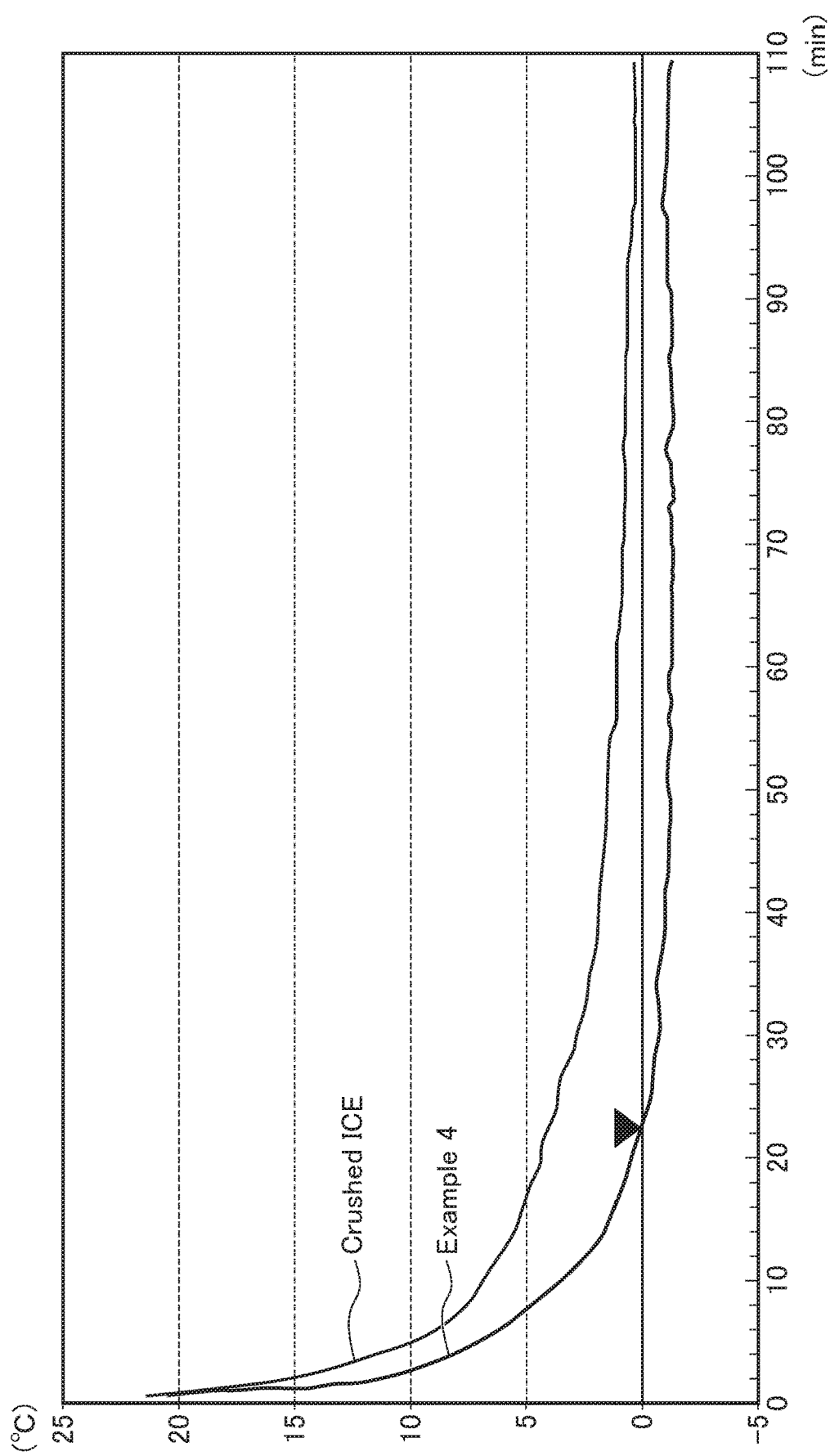
FIG. 7 is a graph illustrating the time course of the temperature in the process for producing saltwater fish of a refrigerated article produced using ice according to Example 4 and saltwater fish of a refrigerated article produced using crushed ice.

In addition, with regard to the refrigerated articles produced using the ice according to Example 4 and the crushed ice, the time course of the temperature of the saltwater fish during the production was measured. The results thereof are illustrated in FIG. 7. In FIG. 7, the vertical axis represents the temperature and the horizontal axis represents the time.

As illustrated in FIG. 7, the refrigerated article using the crushed ice even did not reach 0° C. but the refrigerated article using the ice according to Example reached a temperature lower than 0° C. and the temperature was continuously kept. Furthermore, the saltwater fish did not freeze even when it reached a temperature lower than 0° C. since the temperature was not lower than the freezing point of the saltwater fish. From these facts, it has been found that it is possible to maintain plants/animals or portions thereof in a state of not freezing but being at a sufficiently low temperature according to the ice according to Example.

EXPLANATIONS OF LETTERS OR NUMERALS

10: Ice making machine, 11: Vertical drum, 12: Rotary shaft, 12a: Vertical hole, 13: Pipe, 13a: Spraying hole, 14: Arm, 15: Blade, 15a: Serration, 16: Discharge port, 17: Upper bearing member, 19: Protective cover, 20: Geared motor, 21: Rotary joint, 22: Inner cylinder, 23: Outer cylinder, 28: Bush, 30: Salt water storage tank, 31: Pump, 32 and 35: Tube, 33: Salt water tank, and 34: Ice storage tank Hereinafter, suitable aspects of the method for producing ice to be used in the present invention will be described.

[Method for Producing Ice]

The ice according to the present invention can be produced by a method which is a method for producing a liquid which includes ice from an aqueous solution (salt water) including common salt and includes a step of generating ice which is from a liquid that includes an aqueous solution on a wall surface kept at a temperature equal to or lower than a solidifying point of the aqueous solution by nebulizing the liquid that includes the aqueous solution including common salt onto the wall surface and a step of collecting the ice generated on the wall surface.

(Ice Generating Step)

The present invention is a method for producing ice which is from a liquid that includes an aqueous solution including common salt, which includes a step of generating ice which is from a liquid that includes an aqueous solution including a solute on a wall surface kept at a temperature equal to or lower than a solidifying point of the aqueous solution by nebulizing the liquid that includes the aqueous solution onto the wall surface and a step of collecting the ice generated on the wall surface.

It is impossible to produce the ice of the present invention even when a liquid that includes an aqueous solution and is in a state of being accumulated in a container is cooled from the outside in the prior art. It is considered that this is because the cooling speed is not sufficient. However, in the production method of the present invention, rapid cooling which has not been realized in the prior art is possible as the misty aqueous solution comes into direct contact with the wall surface kept at a temperature equal to or lower than a solidifying point of the aqueous solution by nebulizing a liquid that includes an aqueous solution including common salt. It is considered that the present invention can generate ice which satisfies the conditions (a) and (b) and has a high instantaneous freezing capacity by this.

Examples of the wall surface may include the inner wall of a cylindrical structure such as the vertical drum 11 in FIG. 8 to be described later, but the wall surface is not particularly limited as long as it is a wall surface which can be kept at a temperature equal to or lower than the solidifying point of the aqueous solution. The temperature of the wall surface is not particularly limited as long as it is kept at a temperature equal to or lower than the solidifying point of the aqueous solution, but it is preferable that the temperature is kept at a temperature lower by 1° C. or greater (a temperature lower by 2° C. or greater, a temperature lower by 3° C. or greater, a temperature lower by 4° C. or greater, a temperature lower by 5° C. or greater, a temperature lower by 6° C. or greater, a temperature lower by 7° C. or greater, a temperature lower by 8° C. or greater, a temperature lower by 9° C. or greater, a temperature lower by 10° C. or greater, a temperature lower by 11° C. or greater, a temperature lower by 12° C. or greater, a temperature lower by 13° C. or greater, a temperature lower by 14° C. or greater, a temperature lower by 15° C. or greater, a temperature lower by 16° C. or greater, a temperature lower by 17° C. or greater, a temperature lower by 18° C. or greater, a temperature lower by 19° C. or greater, a temperature lower by 20° C. or greater, a temperature lower by 21° C. or greater, a temperature lower by 22° C. or greater, a temperature lower by 23° C. or greater, a temperature lower by 24° C. or greater, a temperature lower by 25° C. or greater, and the like) than the solidifying point of the aqueous solution from the viewpoint of being able to produce ice which satisfies the conditions (a) and (b) and has a high purity of ice.

The nebulizing method is not particularly limited, but the liquid can be nebulized, for example, by being sprayed through a spraying means having a spraying hole as the pipe 13 in FIG. 8 to be described later. In this case, the water pressure at the time of spraying may be, for example, 0.001 MPa or more (0.002 MPa or more, 0.005 MPa or more, 0.01 MPa or more, 0.05 MPa or more, 0.1 MPa or more, 0.2 MPa or more, and the like) or 1 MPa or less (0.8 MPa or less, 0.7 MPa or less, 0.6 MPa or less, 0.5 MPa or less, 0.3 MPa or less, 0.1 MPa or less, 0.05 MPa or less, 0.01 MPa or less, and the like).

Figure 8:
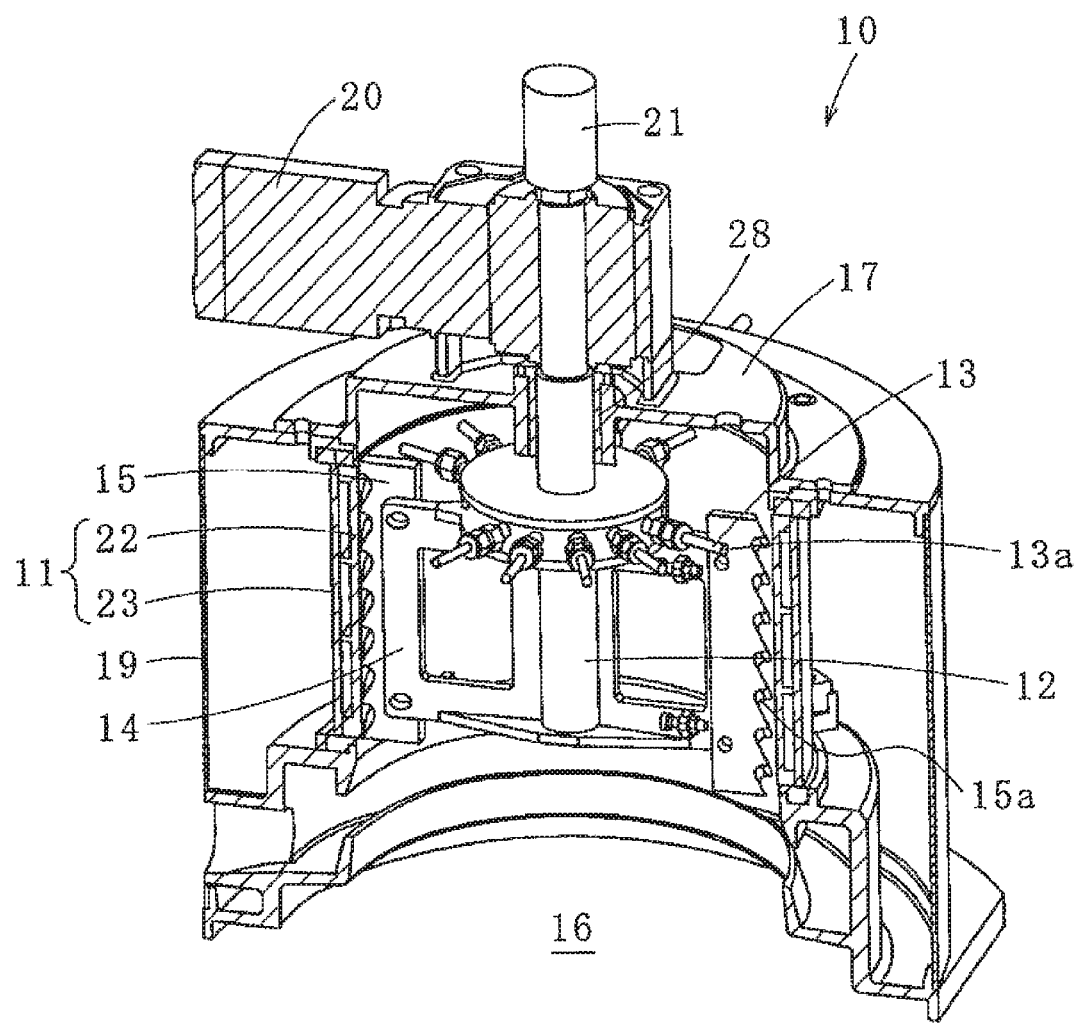
FIG. 8 is a partial cross-sectional perspective view of an ice making machine to be in a method for producing frozen fresh plants/animals or portions thereof according to an embodiment of the present invention.

In addition, as illustrated in FIG. 8 to be described later, nebulization of the liquid may be conducted through continuous nebulization in which a rotating means such as a rotatable rotary shaft 12 is provided on the central axis of the vertical drum 11 and nebulization is conducted while rotating the rotating means.

(Collecting Step)

The present invention has a step of collecting the ice generated on the wall surface after the ice generating step described above.

Figure 9:
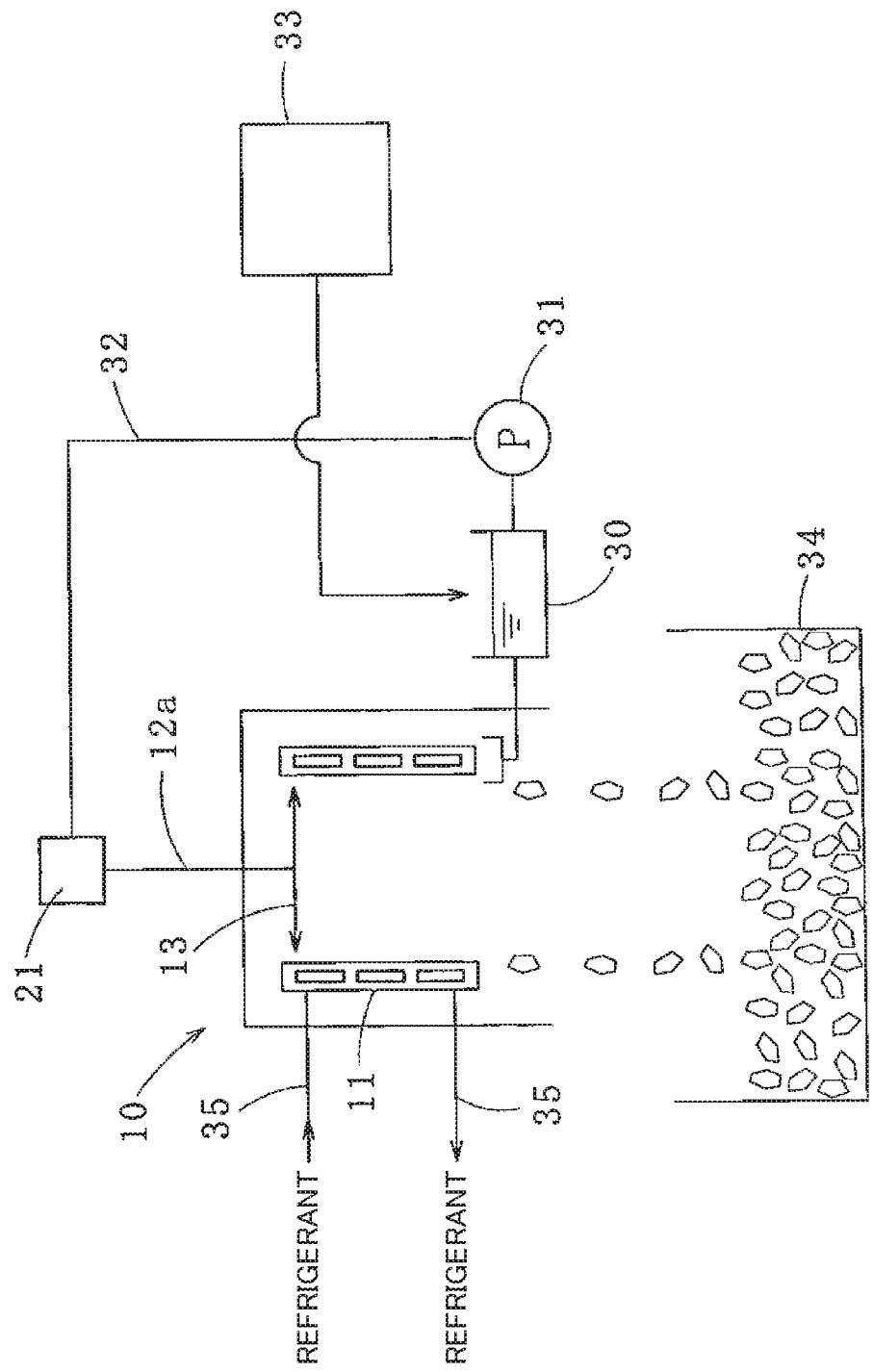
FIG. 9 is a schematic view of an ice making system including the same ice making machine.

The collecting method is not particularly limited, and for example, the ice on the wall surface may be scraped off using a means such as the blade 15 and the ice which has fallen may be collected as illustrated in FIG. 9 to be described later.

In addition, heat by ice making is generated when ice is generated, but there is a possibility that actual melting completion temperature is affected as the ice exposed to this heat by ice making. It is considered that the melting completion temperature is affected not only by the kind and concentration of solute but also by the heat by ice making in this manner. For this reason, the actual melting completion temperature can be adjusted by adjusting the quantity of heat by ice making remaining on the ice. The adjustment of heat by ice making can be conducted by adjusting the holding time of the ice on the wall surface in the collecting step.

Subsequently, embodiments of an ice making machine and an ice making system to be used in the method for producing ice described above will be described with reference to the accompanying drawings for the purpose of understanding the present invention.

[Ice Making Machine and Ice Making System]

A partial cross-sectional perspective view of an ice making machine 10 to be used for a method of producing frozen fresh plants/animals or portions thereof according to an embodiment of the present invention is illustrated in FIG. 8, and an ice making system including the ice making machine 10 illustrated in FIG. 9. Incidentally, common salt is used as a solute in the following example of an ice making machine. The ice making machine 10 includes a vertical drum 11 of which the inner peripheral surface is cooled with a refrigerant, and a rotary shaft 12 which is rotated by a geared motor 20 is disposed on the central axis of the vertical drum 11. To the rotary shaft 12, a plurality of pipes 13 which rotate together with the rotary shaft 12 and have a spraying hole 13a for spraying salt water toward the inner peripheral surface of the vertical drum 11 at the tip portion and an arm 14 which extends in the radial direction of the vertical drum 11 and rotates together with the rotary shaft 12 are attached. A blade 15 for scraping off ice generated on the inner peripheral surface of the vertical drum 11 is mounted at the tip portion of the arm 14.

The vertical drum 11 has an inner cylinder 22 having an inner peripheral surface on which ice is generated and an outer cylinder 23 surrounding the inner cylinder 22. The inner cylinder 22 and the outer cylinder 23 are made of steel, and a clearance is provided between the inner cylinder 22 and the outer cylinder 23. To the clearance, a refrigerant is supplied from a freezing machine (not illustrated) via a tube 35. Incidentally, the outer peripheral surface of the vertical drum 11 is covered with a cylindrical protective cover 19.

The upper surface of the vertical drum 11 is sealed with an upper bearing member 17 having a shape formed as a pot is inverted. A bush 28 for supporting the rotary shaft 12 is fitted at the central portion of the upper bearing member 17. The rotary shaft 12 is supported only by the upper bearing member 17, and the lower end portion of the rotary shaft 12 is not pivotally supported. For this reason, there is no obstacle at the lower place of the vertical drum 11 when the ice scraped off by the blade 15 falls, and the lower surface of the vertical drum 11 serves as a discharge port 16 for discharging ice. The ice which has fallen through the discharge port 16 is stored in an ice storage tank 34 disposed immediately below the ice making machine 10 (see FIG. 9).

The rotary shaft 12 is rotated around the material axis by the geared motor 20 installed above the upper bearing member 17. A vertical hole 12a which extends in the material axial direction and communicates with each pipe 13 is formed at the upper portion of the rotary shaft 12 (see FIG. 9). In addition, a rotary joint 21 is attached to the top portion of the rotary shaft 12. Salt water to be a raw material of ice is fed from a salt water storage tank 30 to the rotary joint 21 via a tube 32 (see FIG. 9). The salt water fed to the rotary joint 21 is fed from the rotary joint 21 to the vertical hole 12a formed on the rotary shaft 12 and is fed from the vertical hole 12a to each pipe 13.

The pipe 13 radially extends from the rotary shaft 12 in the radial direction of the vertical drum 11. The installation height of each pipe 13 is set to the upper position of the height of the inner cylinder 22 of the vertical drum 11, and salt water is sprayed toward the upper portion of the inner peripheral surface of the inner cylinder 22 (see FIG. 8). The water pressure when spraying salt water through the spraying hole 13a is, for example, about 0.01 MPa. Incidentally, a spray nozzle or the like may be used instead of the pipe 13. In this case, the spraying pressure can be set to, for example, from 0.2 to 0.5 MPa.

The arm 14 is mounted so as to be symmetrical to the rotary shaft 12. In the present embodiment, the number of the arms 14 is set to two. The blade 15 mounted at the tip portion of each arm 14 is made of a stainless steel plate material having a length substantially equal to the total length (total height) of the inner cylinder 22, and a plurality of serrations 15a are formed on the end face facing the inner cylinder 22.

Next, the operation of the ice making machine 10 having the above configuration and the ice making system will be described. By running the freezing machine, the refrigerant is supplied to the vertical drum 11 to set the temperature of the inner peripheral surface of the vertical drum 11 to from −20° C. to −25° C. Subsequently, the geared motor 20 is run to supply salt water into the rotary shaft 12 via the rotary joint 21 as well as to rotate the rotary shaft 12 around the material axis. The rotational speed of the rotary shaft 12 is set to from 2 to 4 rpm. Incidentally, the rotational speed of the rotary shaft 12 is set to from 10 to 15 rpm in the case of using a spray nozzle instead of the pipe 13.

Salt water sprayed toward the inner peripheral surface of the vertical drum 11 through the pipe 13 rotating together with the rotary shaft 12 is instantly frozen when coming into contact with the inner peripheral surface of the vertical drum 11. The ice generated on the inner peripheral surface of the vertical drum 11 is scraped off by the blade 15 rotating together with the arm 14. The ice scraped off falls through the discharge port 16. The ice which has fallen through the discharge port 16 is stored in the ice storage tank 34 disposed immediately below the ice making machine 10 and used for maintaining the freshness of fresh plants/animals.

Meanwhile, the salt water which has not converted to ice but has flowed down the inner peripheral surface of the vertical drum 11 is stored in the salt water storage tank 30 and fed again to the rotary joint 21 via the tube 32 by running a pump 31 (see FIG. 9). Incidentally, in a case in which the salt water in the salt water storage tank 30 decreases, the salt water stored in a salt water tank 33 is supplied to the salt water storage tank 30.

[Method for Producing Frozen Fresh Plant/Animal or Portion Thereof]

The procedure of the method for producing frozen fresh plants/animals or portions thereof according to an embodiment of the present invention will be described below.

(1) An ice slurry (sherbet-like ice) is produced by mixing ice generated by freezing salt water having a salt concentration of from 13.6% to 23.1% by using the ice making machine 10 and salt water having a salt concentration of from 13.6% to 23.1%. The temperature of the ice slurry thus produced is from −9.8° C. to −21.2° C., but the size of crystal of ice generated in the fresh plants/animals or portions thereof can be decreased as the temperature is lower. The temperature of the salt water to be mixed with the generated ice is set to room temperature or a temperature lower than room temperature. Incidentally, the ice making efficiency is higher as the temperature of the salt water is lower. In addition, it is preferable that the salt concentration in the ice and the salt concentration in the salt water to be mixed are about the same (concentration difference: several percent), and the mass ratio between the ice and salt water to be mixed is set to ice: salt water=75:25 to 20:80 and preferably ice:salt water=60:40 to 50:50.

(2) Fresh plants/animals or portions thereof are immersed in the ice slurry thus produced and instantaneously frozen. The immersion time varies depending on the kind of fresh plants/animals, but it is, for example, about from 1 minute to 1 hour. The surface of the fresh plants/animals or portions thereof immersed in the ice slurry instantly freezes. (3) The instantaneously frozen fresh plants/animals or portions thereof are taken out from the ice slurry. Thereafter, the fresh plants/animals or portions thereof thus taken out are cryopreserved at a temperature equal to or lower than the temperature (−9.8° C. to −21.2° C.) at the time of instantaneous freezing and transported in a cryopreserved state.

[Method of Defrosting Instantaneously Frozen Fresh Plant/Animal or Portion Thereof]

The defrosting time varies depending on the kind of fresh plants/animals, and for example, it is about from 1 to 2 hours in the case of defrosting instantaneously frozen fresh plants/animals or portions thereof by natural defrosting. This makes it possible to obtain almost the same taste and mouthfeel as fresh marine products.

[Defrosted Article or Processed Article Thereof]

The present invention includes a defrosted article obtained by defrosting the frozen fresh plants/animals or portions thereof produced by the method described above or a processed article thereof.

The frozen fresh plants/animals or portions thereof to be produced by the method described above are instantaneously frozen, and thus the tissue damage of defrosted article thereof is minor (for example, to have a feature that damage to the outer surface and the like are minor). For this reason, according to the present invention, it is possible to provide a new defrosted article or a processed article thereof which has less tissue damage than the conventional defrosted article or a processed article thereof.

The processed article is not particularly limited as long as it is a processed article of the defrosted article, and it may be, for example, a cooked article such as a grilled article or a cut article.

[Freezing Material for Fresh Plant/Animal or Portion Thereof]

The present invention includes a freezing material for fresh plants/animals or portions thereof including ice which satisfies the following conditions (a) and (b) and is from a liquid that includes an aqueous solution including a solute: (a) A temperature of the ice after melting completely is lower than −5° C.; (b) A rate of change of solute concentration in an aqueous solution to be generated from the ice in melting process is 30% or less.

As the conditions (a) and (b) for the ice of the present invention, the same conditions as the conditions (a) and (b) for the ice in the method for producing frozen fresh plants/animals or portions thereof described above can be exemplified. In addition, the solute is not limited to common salt, is not particularly limited as long as it is a solute using water as a solvent, and can be appropriately selected depending on the desired solidifying point, the application of ice to be used, and the like.

In addition, as the target of freezing by the freezing material, those that are the same as the fresh plants/animals or portions thereof in the method for producing frozen fresh plants/animals or portions thereof described above can be exemplified.

In addition, the freezing material of the present invention may be the ice slurry of the ice generated by freezing salt water having a salt concentration of from 13.6% to 23.1% and salt water having a salt concentration of from 13.6% to 23.1% described above.

In a case in which the freezing material of the present invention includes a solid having a higher thermal conductivity than the ice of the present invention described above, the freezing material is suitable for long-time instantaneous freezing even when it includes a large amount of solid as described above, and for example, the mass of the solid having a higher thermal conductivity than the ice of the present invention/the mass of the ice of the present invention included in the freezing material (or the total mass of the ice of the present invention included in the freezing material and the liquid that includes an aqueous solution) may be 1/100000 or more (1/50000 or more, 1/10000 or more, 1/5000 or more, 1/1000 or more, 1/500 or more, 1/100 or more, 1/50 or more, 1/10 or more, 1/5 or more, 1/4 or more, 1/3 or more, 1/2 or more, and the like).

In addition, the solid in the freezing material of the present invention may be included in the form of being included inside the ice of the present invention or in the form of being included outside the ice, but the instantaneous freezing capacity is higher when the solid is included in the form of being included outside the ice since the solid is likely to come into direct contact with the target of instantaneous freezing. For this reason, it is preferable that the solid is included in the form of being included outside the ice. In addition, in a case in which the freezing material of the present invention includes the solid described above, ice may be produced by the method for producing ice of the present invention and then mixed with the solid or ice may be produced in a state in which the solid is mixed with water to be a raw material of the ice in advance.

Embodiments of the present invention have been described above, but the present invention is not in any way limited to the configurations described in the above-mentioned embodiments, and the present invention also includes other embodiments and modifications that can be considered within the scope of the matters described in the claims. For example, in the above-mentioned embodiments, a drum type ice making machine is used as the ice making machine, but the present invention is not limited thereto, and another type of ice making machine may be used.

EXAMPLES

Example 5

Salt water having a salt concentration of 23.1% was prepared and this was frozen by using the ice making machine 10 described above to obtain ice. The ice had (a) a temperature lower than −5° C. after melting completely. In addition, the concentration of saline solution in the aqueous solution in the melting process was approximately constant, that is, (b) the rate of change of the solute concentration in the aqueous solution to be generated from the ice in the melting process was 30% or less. Salt water having a salt concentration of 23.1% was obtained by melting this ice, and an ice slurry of this ice and salt water having a salt concentration of from 13.6% to 23.1% was produced.

It was possible to instantaneously freeze fresh marine products when the fresh marine products were immersed in the ice slurry. The instantaneously frozen fresh marine products were significantly delicious when being defrosted and tasted. From this fact, it has been found that it is possible to produce higher-quality refrigerated marine products without deteriorating the freshness and taste as compared to those produced using conventional slurry salt-including ice.

Example 6

Ice (hereinafter referred to as the "ice (solution: saturated saline solution)") according to Example 6) from an aqueous solution (saturated saline solution) including common salt as a solute at 23.1% was produced in the same manner as in Example 5 by using the ice making machine 10 described above. In addition, one in which copper was added to the ice (solution: saturated saline solution) according to Example 6 was prepared and this was used as the ice (solution: saturated saline solution+CU) according to Example 6. Furthermore, a saturated saline solution (aqueous solution at −20° C.) which had not been frozen was prepared.

Figure 10:
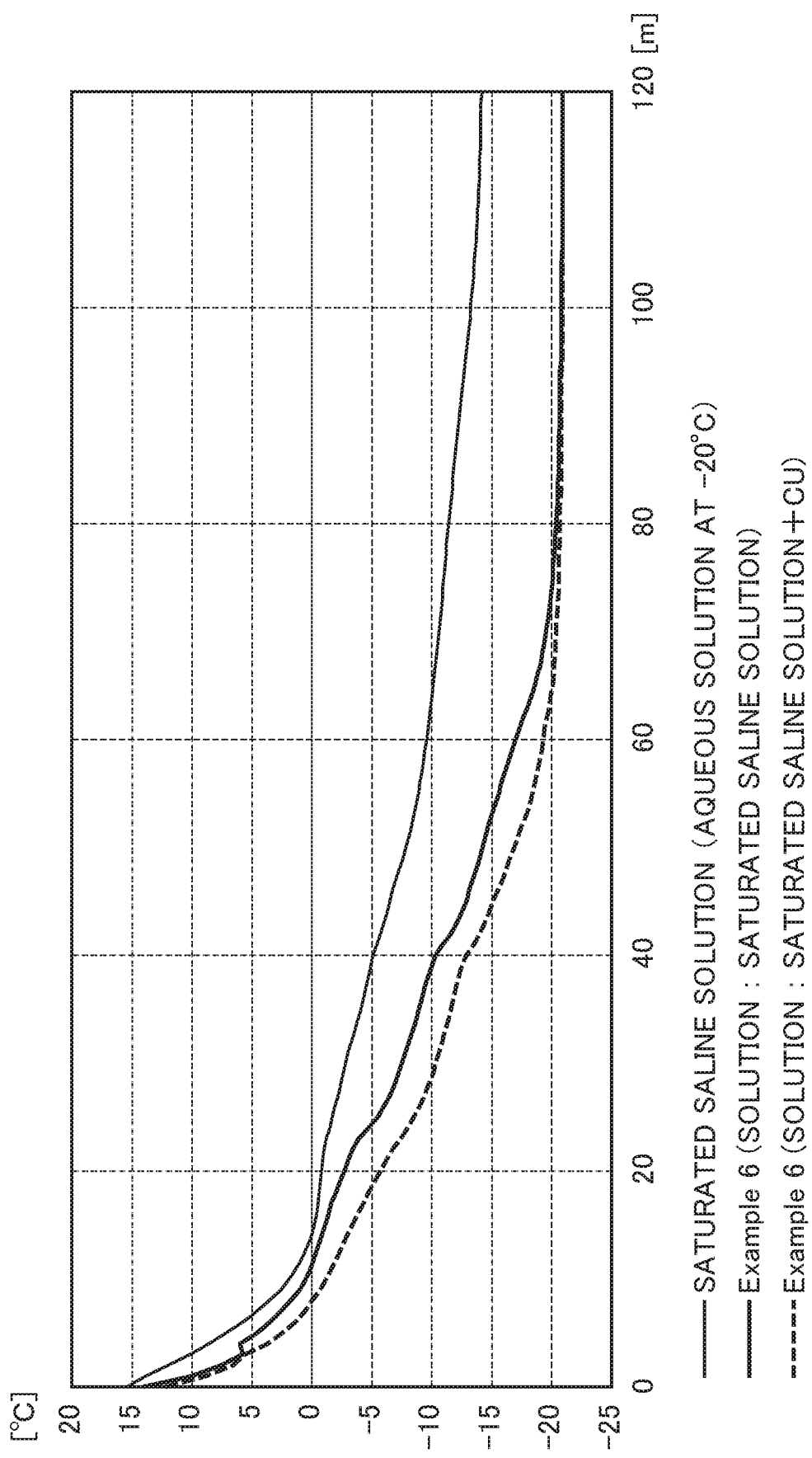
FIG. 10 is a graph illustrating the time course of the core temperature of fish body when fish are cooled with ice (solution: saturated saline solution) according to Example 6, ice (solution: saturated saline solution+CU) according to Example 6, and saturated saline solution (aqueous solution at −20° C.).

Fish were cooled using the ice (solution: saturated saline solution) according to Example 6, the ice (solution: saturated saline solution+CU) according to Example 6, and the saturated saline solution (aqueous solution at −20° C.) to be frozen, and the time course of the core temperature of fish body was measured. The results thereof are illustrated in FIG. 10. In FIG. 10, the vertical axis represents the temperature (° C.) and the horizontal axis represents the time (minute).

As illustrated in FIG. 10, it has been found that the ice (solution: saturated saline solution+CU) according to Example 6 has a higher fish cooling capacity than the ice (solution: saturated saline solution) according to Example 6. From this result, it has been found that the instantaneous freezing capacity increases as a solid having a higher thermal conductivity than ice such as copper is further added.

EXPLANATIONS OF LETTERS OR NUMERALS

10: Ice making machine, 11: Vertical drum, 12: Rotary shaft, 12a: Vertical hole, 13: Pipe, 13a: Spraying hole, 14: Arm, 15: Blade, 15a: Serration, 16: Discharge port, 17: Upper bearing member, 19: Protective cover, 20: Geared motor, 21: Rotary joint, 22: Inner cylinder, 23: Outer cylinder, 28: Bush, 30: Salt water storage tank, 31: Pump, 32 and 35: Tube, 33: Salt water tank, and 34: Ice storage tank

The invention claimed is:

1. An ice which satisfies the following conditions (a) and (b) and is from a liquid that comprises an aqueous solution including a solute:
   (a) a temperature of the ice after melting completely is lower than 0° C.; and
   (b) a rate of change of solute concentration in an aqueous solution to be generated from the ice in melting process is 30% or less,
   wherein the liquid further comprises raw milk.

2. The ice according to claim 1, wherein the solute includes two or more kinds of solutes having different degrees of solidifying point depression.

3. A refrigerant comprising the ice according to claim 1.

4. The refrigerant according to claim 3, further comprising water including the same solute as a solute included in the ice, wherein a ratio of a concentration of the solute in the ice to a concentration of the solute in the water is from 75:25 to 20:80.

5. The refrigerant according to claim 3, further comprising a solid having a higher thermal conductivity than the ice.

\* \* \* \* \*